United States Patent
Tanaka et al.

(10) Patent No.: US 8,374,265 B2
(45) Date of Patent: Feb. 12, 2013

(54) SIGNAL PROCESSING CIRCUIT, SIGNAL PROCESSING METHOD AND RECORDING MEDIUM

(75) Inventors: Akio Tanaka, Tokyo (JP); Kiyoshi Yanagisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 303 days.

(21) Appl. No.: 12/863,943

(22) PCT Filed: Feb. 3, 2009

(86) PCT No.: PCT/JP2009/051766
§ 371 (c)(1),
(2), (4) Date: Jul. 21, 2010

(87) PCT Pub. No.: WO2009/099052
PCT Pub. Date: Aug. 13, 2009

(65) Prior Publication Data
US 2010/0296592 A1    Nov. 25, 2010

(30) Foreign Application Priority Data

Feb. 4, 2008 (JP) ................................ 2008-024360

(51) Int. Cl.
*H04K 1/10* (2006.01)
*H04L 27/28* (2006.01)
(52) U.S. Cl. ........ 375/260; 375/132; 375/133; 375/135; 375/136; 370/330; 370/436
(58) Field of Classification Search .................. 375/132, 375/133, 135, 136, 260; 370/330, 436
See application file for complete search history.

(56) References Cited

U.S. PATENT DOCUMENTS

| 7,940,830 | B2 * | 5/2011 | Marsili et al. ................. 375/134 |
| 2004/0047285 | A1 | 3/2004 | Foerster et al. | |
| 2005/0170807 | A1 * | 8/2005 | Rebel ............................. 455/323 |
| 2005/0255822 | A1 * | 11/2005 | Friedrich et al. .............. 455/323 |
| 2007/0189361 | A1 * | 8/2007 | Sugiyama et al. ............ 375/132 |
| 2007/0223615 | A1 * | 9/2007 | Dosanjh et al. ............... 375/267 |
| 2008/0013755 | A1 | 1/2008 | Marsili et al. | |
| 2008/0026708 | A1 | 1/2008 | Marsili et al. | |

FOREIGN PATENT DOCUMENTS

| JP | 1-8045 A | 1/1989 |
| JP | 1-202031 A | 8/1989 |
| JP | 8-46549 A | 2/1996 |
| JP | 8-265219 A | 10/1996 |
| JP | 10-136048 A | 5/1998 |
| JP | 2005175698 A | 6/2005 |
| JP | 2005286509 A | 10/2005 |
| JP | 2006025426 A | 1/2006 |
| JP | 2006203686 A | 8/2006 |
| JP | 2006211034 A | 8/2006 |
| WO | 2006118184 A | 11/2006 |
| WO | 2008056616 A | 5/2008 |

OTHER PUBLICATIONS

International Search Report for PCT/JP2009/051766 mailed Mar. 3, 2009.

* cited by examiner

*Primary Examiner* — Phuong Phu

(57) ABSTRACT

A signal processing circuit, a signal processing method and a recording medium suppressing occurrence of unnecessary waves are provided. A timing generation means which generates timing to select a signal of a predetermined local frequency in a set time period and not to select any signal of all local frequencies in a different set time period, and a plurality of switches which switch over a signal of the local frequency from each multiband generator to the transmission mixer by an instruction from the timing generation means are included.

19 Claims, 24 Drawing Sheets

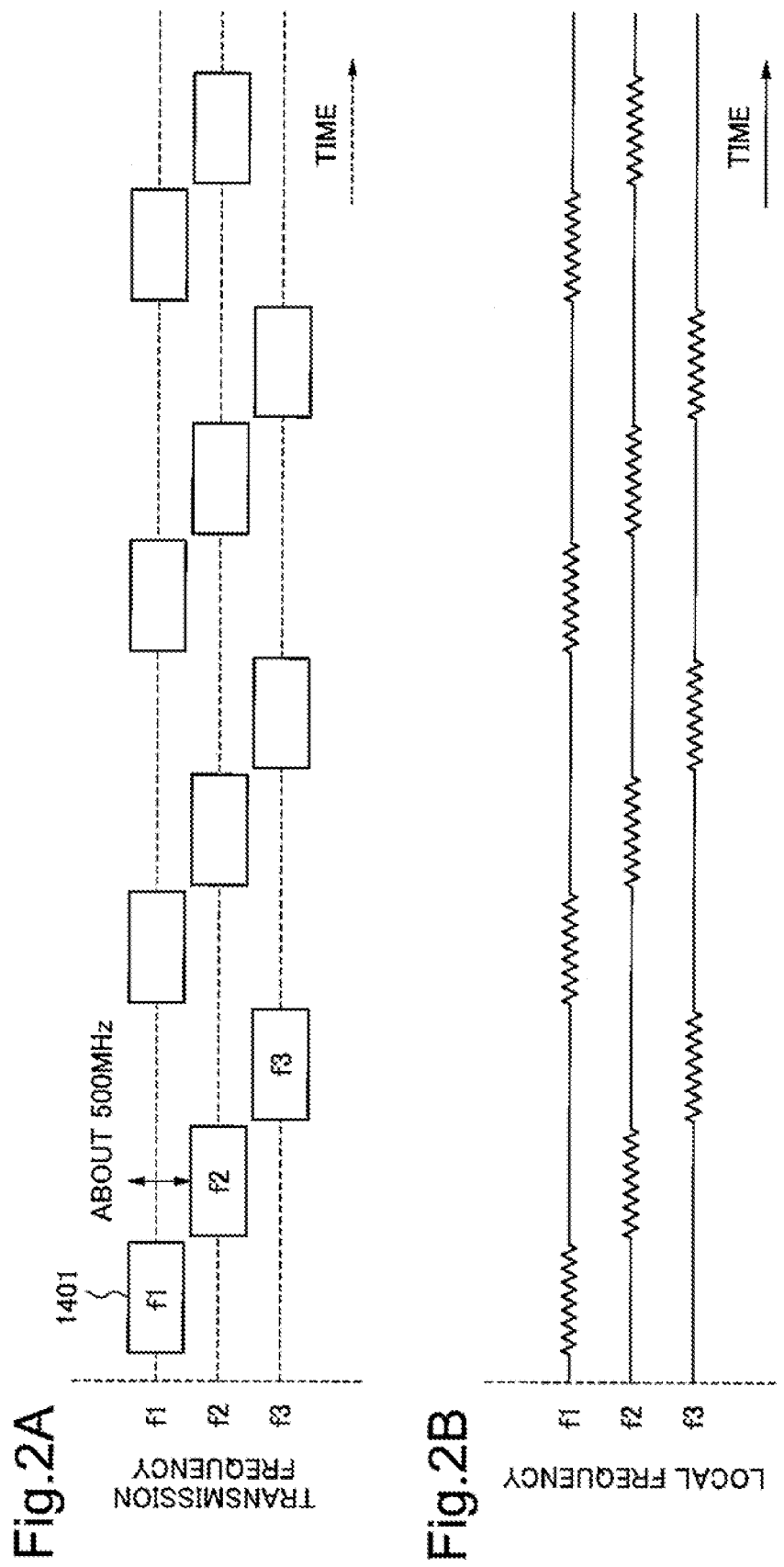

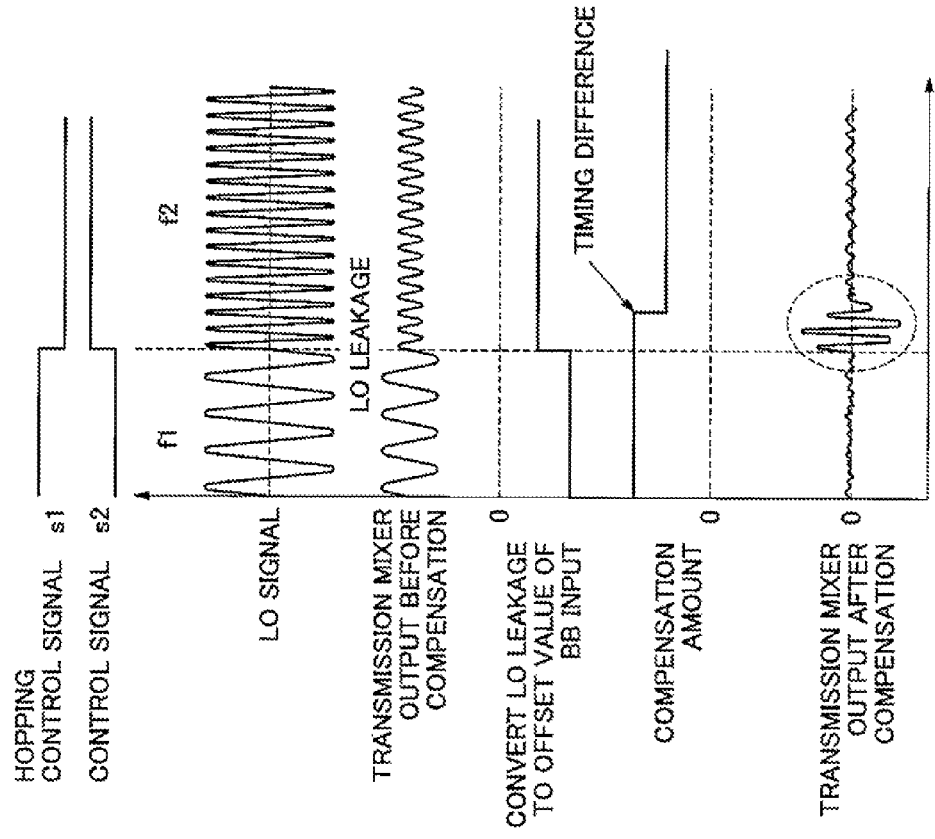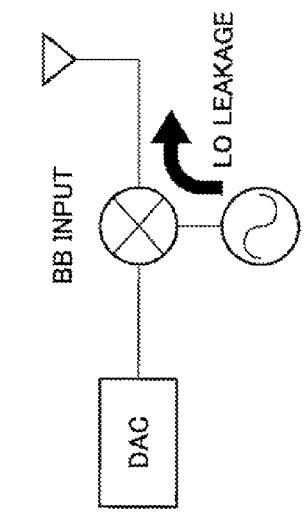

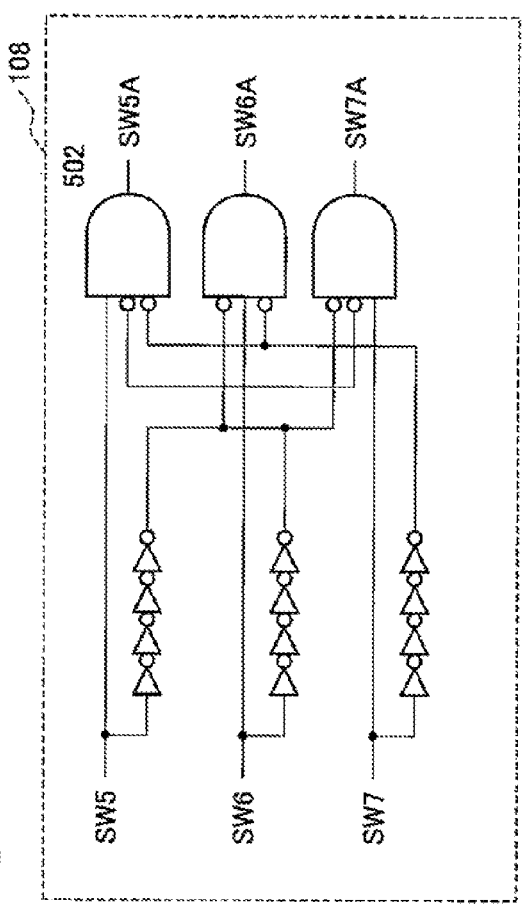
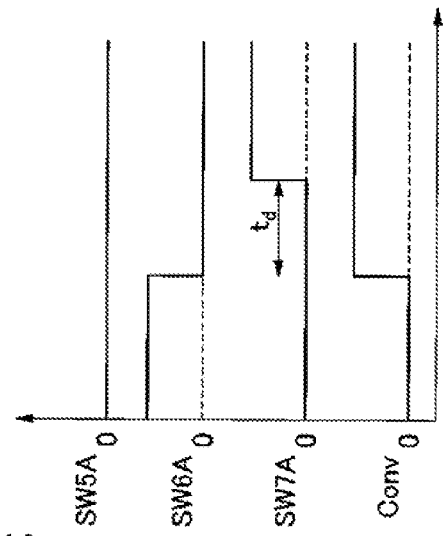
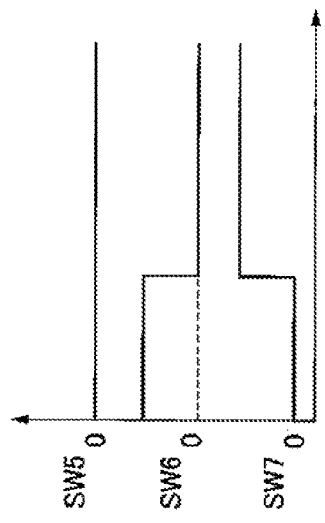
Fig.9A
Fig.9B
Fig.9C

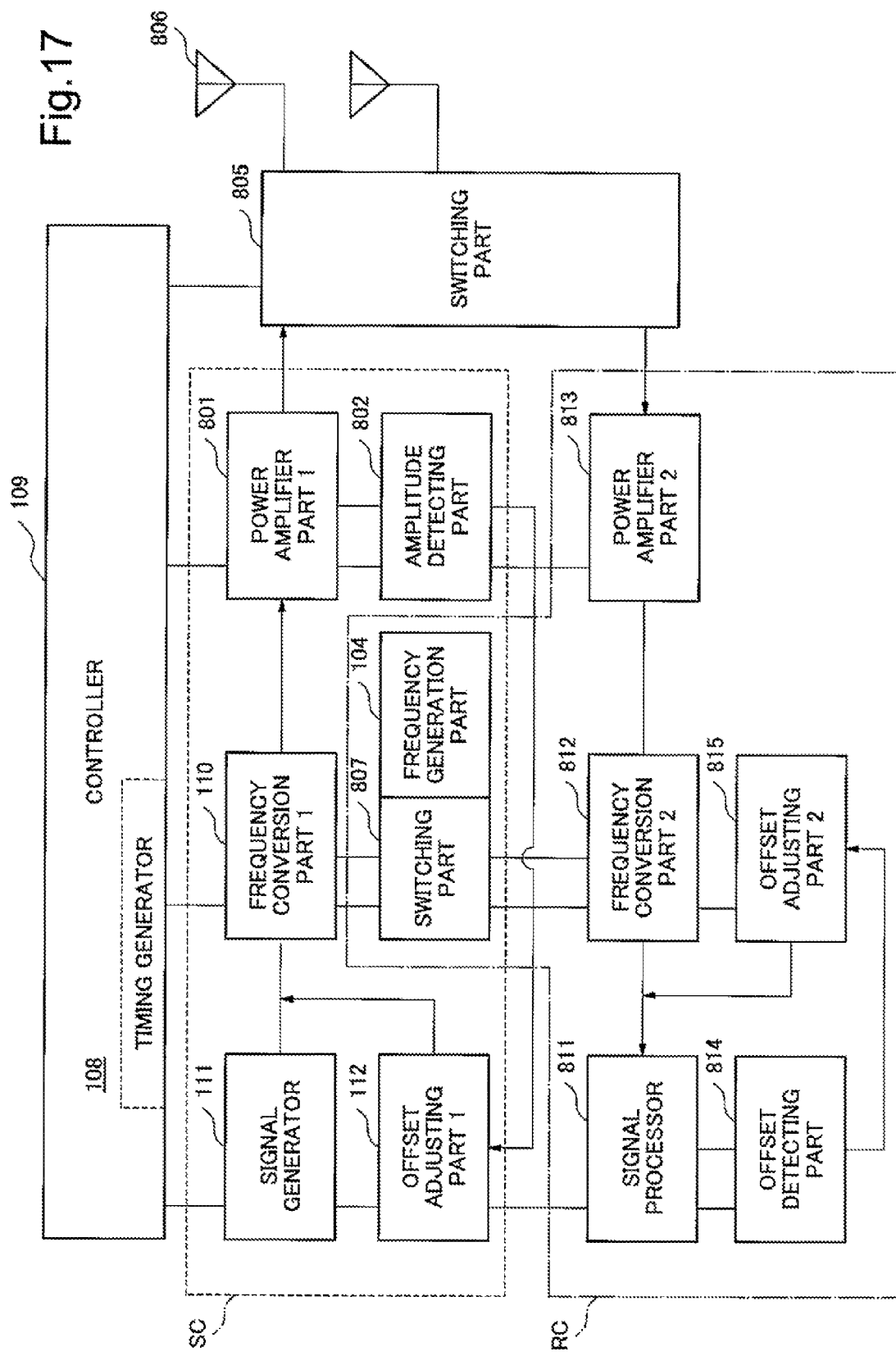

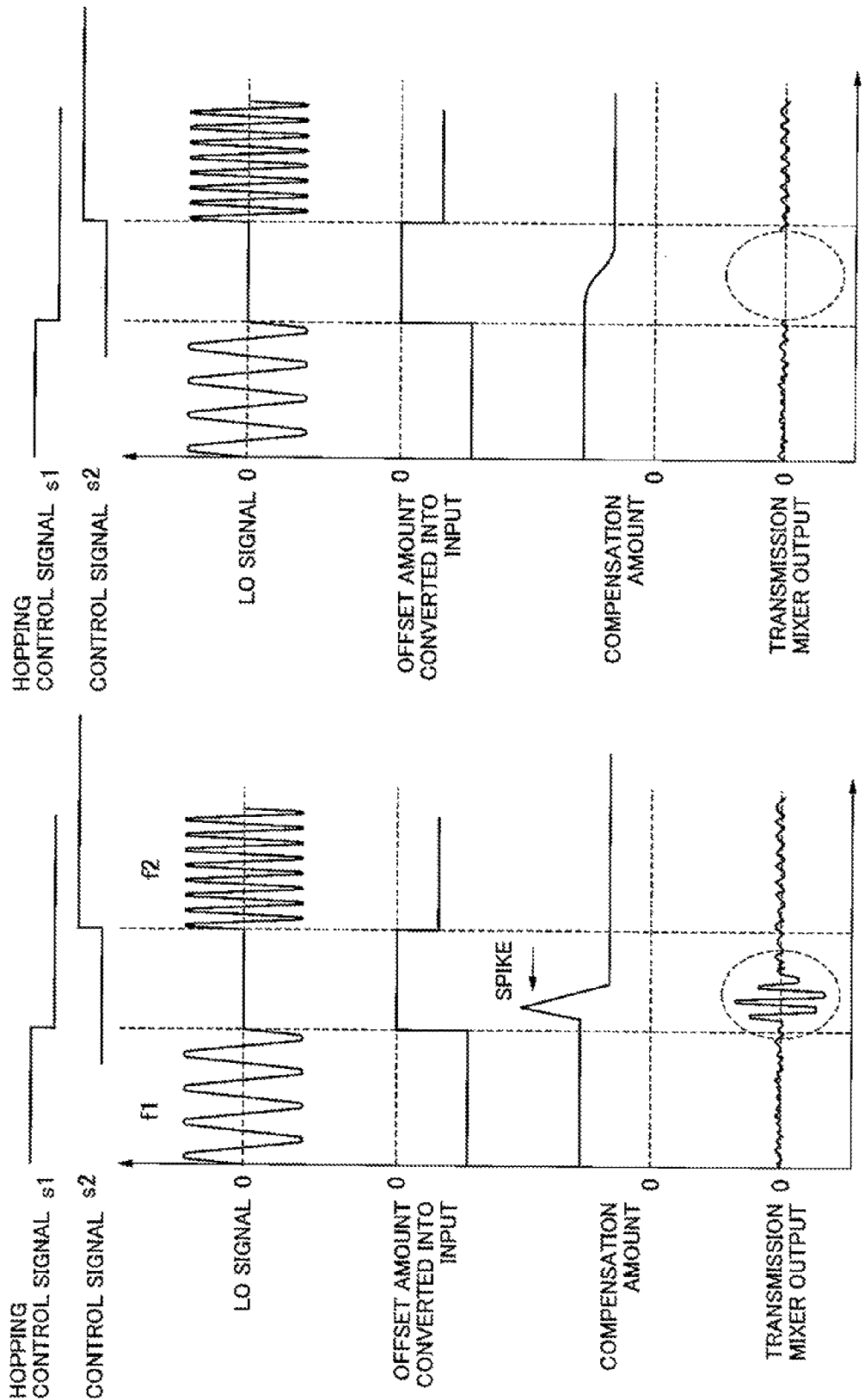

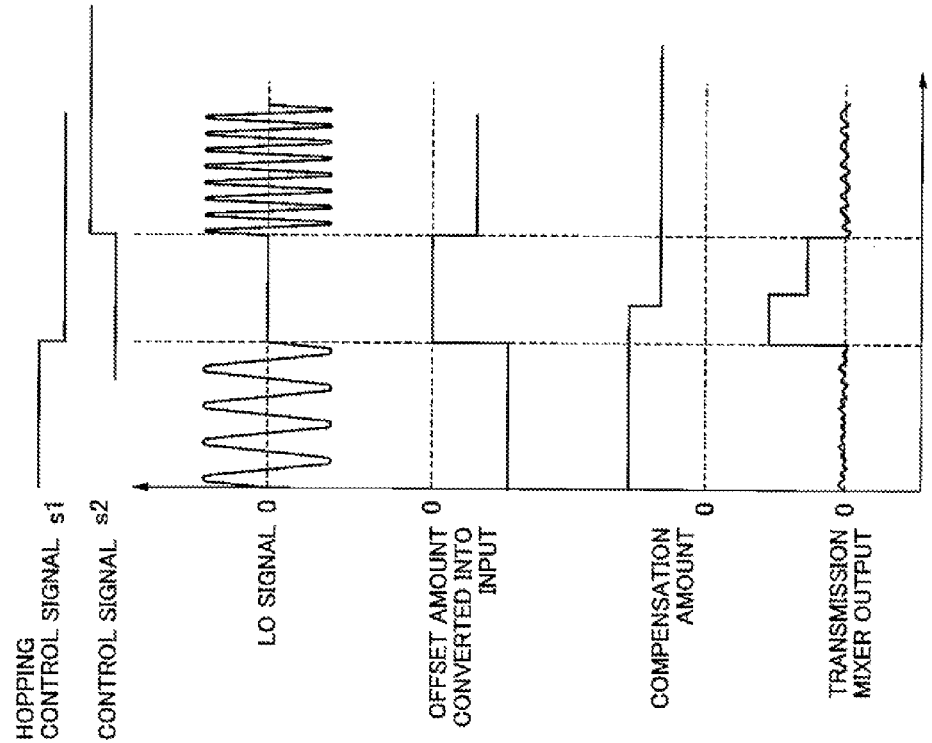
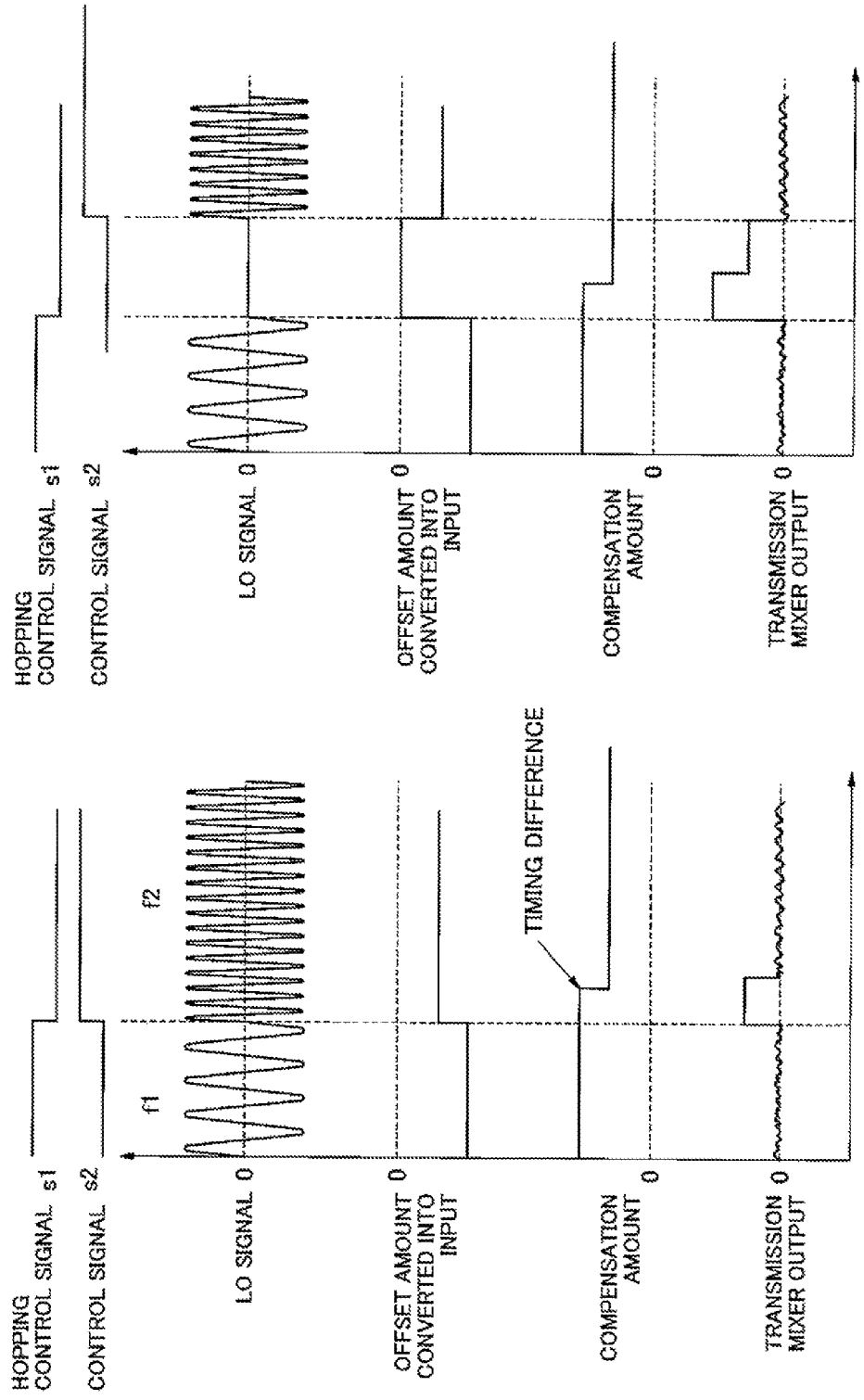

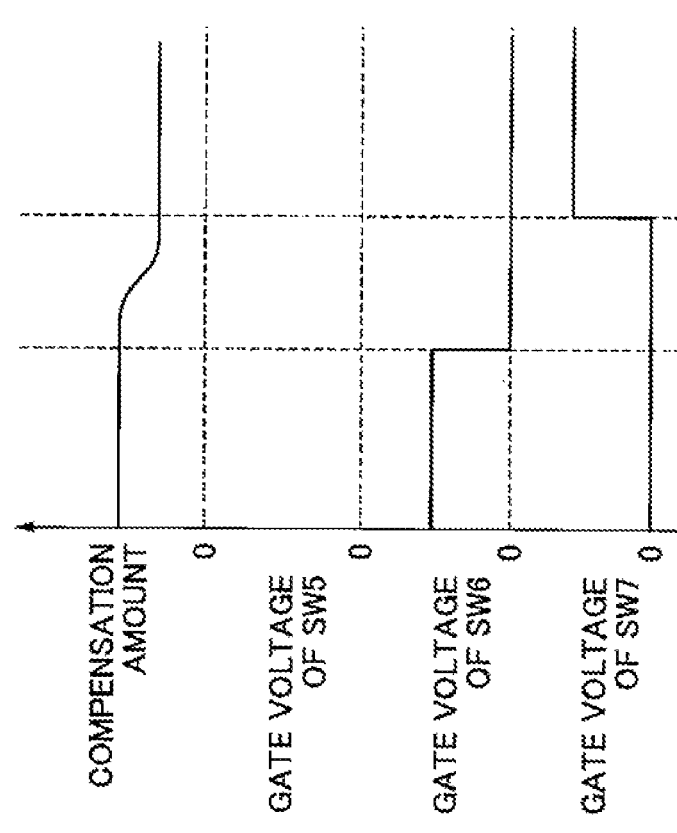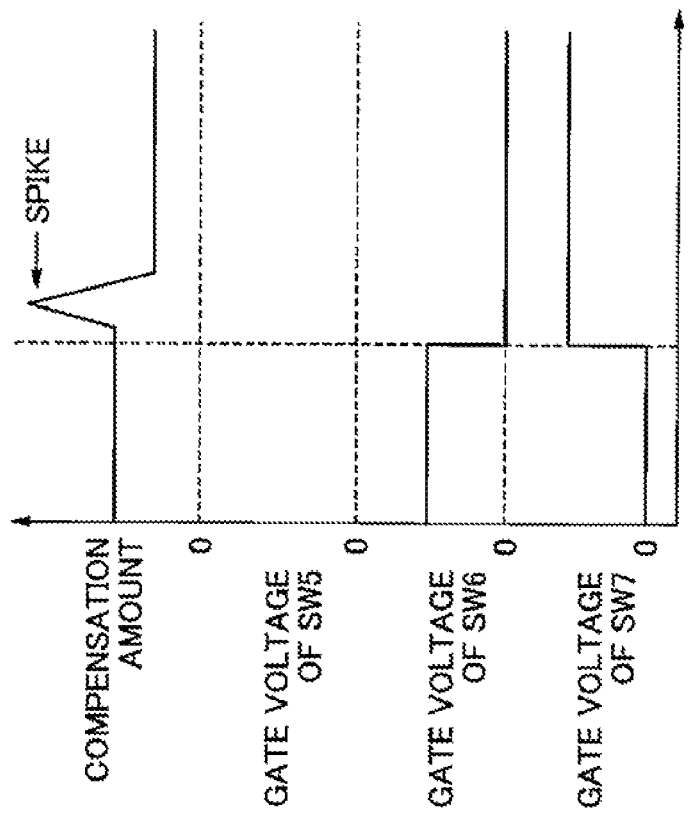

SIGNAL PROCESSING CIRCUIT, SIGNAL PROCESSING METHOD AND RECORDING MEDIUM

This application is the National Phase of PCT/JP2009/051766, filed Feb. 3, 2009, which is based upon and claims the benefit of priority from Japanese Patent Application No. 2008-024360, filed on Feb. 4, 2008, the disclosure of which is incorporated herein in its entirety by reference.

TECHNICAL FIELD

The present invention relates to a signal processing technical field which processes high bandwidth signals such as ultra wideband (UWB) or the like.

BACKGROUND ART

Multiband OFDM-UWB (Orthogonal Frequency Division Multiplexing Ultra Wideband) has been expected as a system of short-distance high-speed communication. In a configuration of a transmitter of this system, a direct conversion system, which modulates baseband signals to RF signals directly without converting into intermediate frequencies once, is used. Because a direct conversion transmitter can be realized by a simple configuration, miniaturization can be expected. On the other hand, as shown in FIG. 1(a), it is known that a phenomenon called LO leakage, that is, signals of local oscillator (hereinafter, referred to as LO) leak to the antenna side through a transmission mixer, occurs. Here, FIG. 1A shows an example of a block diagram of a transmitter in relation to the present invention, FIG. 1B shows another example of a block diagram of the transmitter in relation to the present invention, and FIG. 1C shows an example of a block diagram of a receiver in relation to the present invention.

This LO leakage is generally canceled by adding a DC signal which generates an LO signal with a reversed phase to the LO leakage to the baseband input of a mixer by means of a DAC (D/A converter) or the like. As shown in FIG. 1B, an example of correcting LO leakage is disclosed which includes detecting a carrier leakage amount in a spectrum by using an RF amplitude detector and working with a signal generator (in patent document 1, for example). In this multiband OFDM-UWB system, each band has a 500 MHz bandwidth as shown in FIG. 3A, and a UWB signal hops in turn from band to band per each symbol of 1401. As shown in FIG. 3B, the transmitter needs to make the center frequency hop at high speed in approximately 300 ns cycles. FIG. 3A is a figure showing the frequency characteristics at the time of transmission in the transmitter in relation to the present invention, and FIG. 3B is a figure showing the characteristics of the local frequency in the transmitter in relation to the present invention (for example, refer to patent document 2).

An example of a transmitter which transmits such high-speed hopping signals is proposed in patent document 3. In the related transmitter disclosed in the patent document 3, after switching the frequency of the hopping local signal, the transmitter makes its amplitude increase gradually and after reaching a peak, makes it flat for a while. After that, the transmitter makes the amplitude of the LO signal decrease gradually, and after the amplitude has become zero, it gives the envelope control to switch the frequency to the next one, so the transmitter suppresses the side tone that arises around OFDM signals.

Further, an example of a transmitter, which prevents frequencies other than a required frequency from mixing by stopping frequency dividers other than a frequency divider which generates the required frequency in a multiband generator which generates a plurality of frequencies, is disclosed (for example, refer to patent document 4).

In addition, technologies in relation to the above-mentioned ones are disclosed in patent documents 5-10. A system described in the patent document 5 is a system to calibrate LO leakage and sideband image for an RF transmitter, and it includes a calibration control logic unit and a sensor of an LO leakage and sideband image. The sensor of LO leakage and sideband image senses an LO leakage amount and a sideband image amount on the output of the RF transmitter. The calibration control logic unit receives the sensed LO leakage amount and the sensed sideband image amount and carries out calibration control for the RF transmitter by performing calibration for suppressing LO leakage first, next, performing calibration for suppressing the sideband image.

According to this system, LO leakage is calibrated on the output of the RF transmitter in the state that test tone is being inputted, and the minimum LO leakage is determined. After that, the sideband image is calibrated on the output of the RF transmitter in the state that the test tone is being inputted, and the minimum sideband image is determined. The operational value of the RF transmitter which should be used in a usual operation mode of the RF transmitter is stored in a memory based on the detected minimum LO leakage and the detected minimum sideband image.

A radio communication apparatus described in the patent document 6 is a radio communication apparatus which receives a communication signal hopping among a plurality of frequency bands, and is provided with a frequency conversion part, a high-pass filter part and a receiving processing part. The frequency conversion part performs frequency conversion by multiplying a received communication signal by the local signal with a hopping frequency. The high-pass filter part has capacitors in parallel corresponding to each frequency band for frequency hopping, and switches a connection among the capacitors synchronizing with the frequency hopping. The receiving processing part performs receiving processing of receiving signals passing through the high-pass filter part.

According to this radio communication apparatus, it is supposed that an excellent radio communication apparatus can be provided, which can suitably perform receiving processing by converting the frequency of multiband OFDMUWB signals of which frequency is switched among wideband.

A method described in the patent document 7 fits into an ultra wideband (UWB) receiver, and the UWB receiver receives a series of Multiband Orthogonal Frequency Division Multiplexing (MBOFDM) symbol signals transmitted from a UWB transmitter. Each MBOFDM symbol signal includes a zero padded prefix, a data signal and a guard interval. Time of the zero padded prefix is T1, and time of the guard interval is T2, and T1 is larger than T2, and the total time of the MBOFDM symbol signal is T3. The method described in the patent document 7 is a method for defining a symbol timing window and capturing a signal by the following two stages. Time is delayed by only presetting time T from a starting point of the zero padded prefix, it is set at a starting point of the symbol timing window, time of the symbol timing window is set to T3, and a plurality of receiving symbol signals are received through the symbol timing window. Each receiving symbol signal includes a prefix signal, a received data signal and a guard signal. Time of the prefix signal is T1−T, and time of the guard signal is T2+T, and there is a relation of T≦T1−T2 among T, T1 and T2. The received data signal and the guard signal are captured, the guard signal is added to a head part of the received data signal, and the added received data signal is outputted.

According to this method, the starting point of the symbol timing window is changed. The starting point of the pre-padded prefix of 60.6 ns is changed to a starting point of the guard interval of 9.5 ns. The received data signal of 242.4 ns is captured after 9.5 ns passing, and then Fast Fourier Transform (FFT) is carried out. In the UWB receiver, it is supposed that after the channel effect arises, it is copied in a head part of the received data signal, and orthogonality of the received data signal is kept by that means, and consequently FFT is carried out correctly.

A frequency hopping modulated wave receiving circuit described in the patent document 8 is provided with a synthesizer for generating local oscillation signals and an intermediate frequency amplifier. The synthesizer for generating local oscillation signals can switch over the oscillation frequency by a frequency hopping control signal, and it is locked to the frequency after switching over. The intermediate frequency amplifier is controlled by an AGC control signal. A holding circuit, which is controlled by the frequency hopping control signal and a lock signal from a frequency synthesizer and keeps the AGC control signal fixed at the time of switching over frequency, is provided in the AGC control circuit of the intermediate frequency amplifier.

According to this frequency hopping modulated wave receiving circuit, the AGC control signal at the time of switching over frequency can be kept fixed. Therefore, it is supposed that the output of the intermediate frequency amplifier at the time of switching over frequency becomes stable, and degradation of clearness of voice output caused by gain fluctuation of the intermediate frequency amplifier can be prevented by that means.

A transmitter in the frequency hopping spread spectrum communication described in the patent document 9 is provided with a plurality of frequency generators, a switching means and a modulation means. The frequency generator changes a frequency in turn with keeping the constant frequency during a fixed duration, with timing of changing the frequency being different in each other. The switching means switches over frequency signals outputted from a plurality of frequency generators at predetermined timing so that one of frequency signals may be derived in a stable state of the frequency change. The modulation means modulates the frequency signal derived by the switching means with a data signal.

According to this transmitter, while the output of the frequency generator selected by the switching means is modulated with data in order to put the data on, one of other frequency generators at least is changing its frequency. And in the stable state where the change has ended, the output of this frequency generator is selected by the switching means. It is supposed that by arranging in this way, because the transition duration of the frequency change in each frequency generator is not related to formation of a transmission signal, the transmission speed of signals can be increased.

A clock signal reproducing circuit described in the patent document 10 is a clock signal reproducing circuit which reproduces a clock signal from a receiving signal in the frequency hopping communication. This clock signal reproducing circuit includes a removal means which removes a carrier frequency switching timing part in a receiving signal from the receiving signal and a clock reproduction means which reproduces the clock signal from the receiving signal after this removal.

According to this clock signal reproducing circuit, the carrier frequency switching timing part in the receiving signal is removed from the receiving signal. Specifically, a synchronized signal which is synchronized with the carrier frequency switching timing is generated from the receiving signal, a switch is controlled according to this generated synchronized signal and the carrier frequency switching timing part is removed from the receiving signal. It is supposed that the analog switch is used for this switch.

Patent document 1: Japanese Patent Application Laid-Open No. Hei 10-136048
Patent document 2: U.S. Patent Application Publication No. 2004/0047285
Patent document 3: Japanese Patent Application Laid-Open No. 2005-286509
Patent document 4: Japanese Patent Application Laid-Open No. 2005-175698
Patent document 5: Japanese Patent Application Laid-Open No. 2006-25426
Patent document 6: Japanese Patent Application Laid-Open No. 2006-203686
Patent document 7: Japanese Patent Application Laid-Open No. 2006-211034
Patent document 8: Japanese Patent Application Laid-Open No. Hei 1-202031
Patent document 9: Japanese Patent Application Laid-Open No. Hei 8-46549
Patent document 10: Japanese Patent Application Laid-Open No. Hei 8-265219

DISCLOSURE OF THE INVENTION

Problem to be Solved by the Invention

In a transmitter and receiver which performs hopping at high speed like the technologies described in the patent documents 1-4, the following problems arise if the LO leakage in transmission is to be corrected. Firstly, if LO leakage is corrected only to a certain LO frequency, a problem that LO leakage cannot be corrected arises because a correction value does not fit in a different LO frequency. For example, in case of a transmitter in which the LO frequency is hopping among f1, f2 and f3 at high speed, if LO leakage is corrected at a middle frequency of f2 and LO leakage correction for each of frequencies f1 and f3 is performed by using the correction value of f2, the ideal correction adapted to specifications cannot be performed.

This is because there is a source which depends largely on frequency characteristics among sources of the LO leakage. There are following three sources of the LO leakage. The first is that threshold values of transistors in a transmission mixer vary widely. The second is the feed through phenomenon that an LO signal gets over from the LO port into the RF port in the mixer. The third is a phenomenon that a common mode signal of the LO signal on the LO port cannot be removed by the Common Mode Rejection Ratio (CMRR) after the mixer and it becomes a normal mode signal.

Among these three sources, the latter two have large frequency characteristics. In an ultra wideband radio, each frequency interval among f1, f2 and f3 it is wide corresponding to a baseband bandwidth. Therefore, it is because there is large frequency dependence in occurrence of the LO leakage, and a correction amount of the LO leakage also varies depending on the frequency.

Secondly, even if a plurality of correction circuits are prepared and LO leakage and DC offset are corrected by switching over the correction circuits synchronizing with the frequency hopping, there is a problem that noises arise at switching time and transmission spurious signals or receiving spurious signals arise.

FIGS. 3A and 3B show the mechanism for noise appearance in correcting the LO leakage. FIG. 3A is a block diagram of a transmitter in relation to the present invention. FIG. 3B is a timing chart of each signal in the transmitter shown in FIG. 3A, that is, a timing chart of the hopping control signals, the LO signal, the output of the transmission mixer before compensation, the value for the LO leakage to be converted into an offset amount of the baseband (BB) input, the compensation amount and the output of the transmission mixer after compensation. The LO leakage arises in the transmission mixer by a reason mentioned above. By switching over the LO frequency from f1 to f2, the LO leakage amount also changes as shown in FIG. 3B. Since the LO leakage is also generated by the DC offset on the BB (baseband) port, the LO leakage can be converted into the offset amount of the BB input. The LO leakage can almost be corrected by giving the compensation amount so as to cancel out this offset amount of the BB input. However, there is a timing difference between the offset amount of the BB input and the compensation amount, and the noise arises as shown in FIG. 3B when a frequency is switched over. The spectrum of this noise may be a case of having the LO frequency component, a case of having the frequency resolved component of an impulse caused by a timing difference, or a case of having the LC resonance frequency by L (inductor) and C (capacitor) used for the transmission mixer.

To such new problems, each of related arts mentioned above includes the following problems. In the technology disclosed in the patent document 1, after all, there is no configuration which performs frequency hopping. Therefore, although it can correct the LO leakage which arises fixedly, it cannot deal with the fluctuation of the correction amount which becomes a problem when frequency hopping is performed.

On the other hand, as for the technology disclosed in the patent document 2, although it has a configuration which performs frequency hopping at high speed, it does not have a configuration which takes a measure for LO leakage and DC offset at all.

An example shown in the patent document 3 is a technology which applies the window function to LO signals, so that the side lobe of an unnecessary wave can be suppressed when a frequency is switched over in the frequency hopping. Therefore, it does not have a configuration which takes a measure for LO leakage at all.

An example shown in the patent document 4 is an technology having a configuration for stopping frequency dividers other than the required frequency divider so as not to get mixed each other of a plurality of LO frequencies, and it does not have a configuration which reduces LO leakage at all.

Generally, broadband radio which performs frequency hopping, particularly an ultra wideband radio like UWB, is easily affected by an unnecessary wave because of having a wide baseband bandwidth. Taking UWB for example, a sub carrier frequency (so-called baseband frequency) of OFDM spreads from about 4 MHz to 250 MHz. If an unnecessary wave exists in this baseband frequency, it degrades a receiving signal and a transmission signal. Further, the frequency hopping is performed for every symbol unit of about 300 ns in UWB. This means that it gives a disturbance to the baseband having the above-mentioned bandwidth by hopping every about 3.3 MHz which is the reciprocal of 300 ns. A frequency switching needs to be performed within about 10 ns, and an unnecessary wave, which comprises harmonic or the like having over 100 MHz which is the reciprocal of 10 ns, is given to the baseband as a disturbance.

These LO leakage and DC offset are problems relating to frequency conversion caused by VT fluctuation in the transmission mixer or the receiving mixer or by coupling between ports (a phenomenon that the LO frequency goes around to the RF port or the like). Accompanying high-speed hopping, some problems arise that related arts cannot deal with.

Each invention described in the patent documents 5-10 has a problem that the spike-like noise arises because the spurious signal is always generated due to failure to stop the LO signal itself.

Accordingly, a primary problem of the present invention is to provide a signal processing circuit, a signal processing method and a recording medium which suppresses occurrence of an unnecessary wave. An additional object is to provide a signal processing circuit, a signal processing method and a recording medium which suppresses occurrence of the DC offset at the time of receiving signal processing. Here, it is supposed that the signal processing circuit includes a transmission signal processing circuit, a receiving signal processing circuit and a transmission and receiving signal processing circuit. The signal processing method is also similar.

Means for Solving a Problem

In a transmission signal processing circuit which performs frequency conversion of converting a signal of a plurality of local frequencies generated by a multiband generator and a baseband signal generated by a signal generator into a transmission signal by a transmission mixer, the first signal processing circuit of the present invention is characterized by comprising a timing generation means for generating timing to select a signal of a predetermined local frequency in a set time period and not to select any signal of all local frequencies in a different set time period, and a plurality of switches which switch over a signal of the local frequency from each multiband generator to the transmission mixer by an instruction from the timing generation means.

In a receiving signal processing circuit which performs frequency conversion of converting a receiving signal and a signal of a plurality of local frequencies generated by a multiband generator into a baseband signal by a receiving mixer, the second signal processing circuit of the present invention is characterized by comprising a timing generation means for suspending generation of timing which stops to select all local frequencies, and a plurality of switches which switch over a signal of the local frequency from each multiband generator to the receiving mixer by an instruction from the timing generation means.

In a transmission and receiving signal processing circuit which performs frequency conversion of converting a signal of a plurality of local frequencies generated by a multiband generator and a baseband signal generated by a signal generator into a transmission signal by a transmission mixer, and of converting a receiving signal and a signal of a plurality of local frequencies generated by the multiband generator into a baseband signal by a receiving mixer, the third signal processing circuit of the present invention is characterized by comprising a timing generation means for generating timing to select a signal of a predetermined local frequency in a set time period and not to select a signal of any local frequencies in a different set time period in transmitting, and suspending generation of timing which stops to select all local frequencies in receiving, and a plurality of switches which switch over a signal of the local frequency from each multiband generator to the transmission mixer by an instruction from the timing generation means in transmitting, and switches over a signal of the local frequency from each multiband generator to the receiving mixer by an instruction from the timing generation means in receiving.

In a signal processing method of a signal processing circuit which comprises a plurality of switches for controlling a mixer, a plurality of local signals and passage of the local signal to a local port of the mixer, and a D/A converter for changing differential bias current which flows into the mixer, the first signal processing method of the present invention is characterized by comprising the processes of a first processing to turn on a predetermined switch in a plurality of switches, a second processing to wait the switch operation for a predetermined time period of T1, a third processing to turn off all of a plurality of switches, a fourth processing to change a setting value of the D/A converter, and a fifth processing to wait the switch operation for a predetermined time period of T2.

In a signal processing method of a signal processing circuit which comprises a plurality of switches for controlling a mixer, a plurality of local signals and passage of the local signal to a local port of the mixer, and a D/A converter for changing a differential bias current which flows into the mixer, the second signal processing method of the present invention is characterized by comprising the processes of a first processing to turn on a predetermined switch in a plurality of switches, a second processing to wait the switch operation for a predetermined time period of T1, a third processing to turn off all of a plurality of switches, a fourth processing to wait the switch operation for a predetermined time period of T21, a fifth processing to change a setting value of the D/A converter, and a sixth processing to wait the switch operation for a predetermined time period of T22.

In a recording medium which records a program for causing a computer to execute a processing to control a mixer, a plurality of local signals and passage of the local signal to a local port of the mixer, and a processing to change a differential bias current which flows into the mixer, the first recording media recording a program of the present invention is characterized by causing a computer to execute the processes of a first processing to turn on a predetermined switch in a plurality of switches, a second processing to wait the switch operation for a predetermined time period of T1, a third processing to turn off all of a plurality of switches, a fourth processing to change a setting value of the D/A converter, and a fifth processing to wait the switch operation for a predetermined time period of T2.

In a recording medium which records a program for causing a computer to execute a processing to control a mixer, a plurality of local signals and passage of the local signal to a local port of the mixer, and a processing to change a differential bias current which flows into the mixer, the first recording media recording a program of the present invention is characterized by causing a computer to execute the processes of a first processing to turn on a predetermined switch in a plurality of switches, a second processing to wait the switch operation for a predetermined time period of T1, a third processing to turn off all of a plurality of switches, a fourth processing to wait the switch operation for a predetermined time period of T21, a fifth processing to change a setting value of the D/A converter, and a sixth processing to wait the switch operation for a predetermined time period of T22.

Effect of the Invention

According to the present invention, it generates timing in which a signal of a predetermined local frequency is selected in a set time period, and all local frequencies are not selected in a different set time period. By switching over a correction value while an LO frequency stops, the change of the correction value does not appear on the mixer output, and generation of an unnecessary wave is suppressed. Also, by suspending generation of timing without selecting a signal in all local frequencies, a change in self mixing of the receiving mixer can be suppressed, and generation of DC offset can be suppressed in processing receiving signals.

BEST MODE FOR CARRYING OUT THE INVENTION

An exemplary embodiment according to the present invention relates to a transmission signal processing circuit which converts a signal with one of a plurality of local frequencies generated by a multiband generator and a baseband signal generated by a signal generator into a transmission signal by a transmission mixer. The transmission signal processing circuit is provided with a timing generation means and a plurality of switches. The timing generation means generates timing to select a signal with a predetermined local frequency in a set time period and not to select any signal with one of all local frequencies in a different set time period. The switch switches a signal with the local frequency from each multiband generator to the transmission mixer by an instruction from the timing generation means.

Here, a definition of the ultra wideband radio is a radio having 500 MHz and over bandwidth and having 20% and over fractional bandwidth. However, it is not limited to this, and the excellent effects of the present invention are applicable to any signal processing dealing with broadband signals. The transmission mixer is also referred to as a modulator, a frequency converter or an up converter. Also, a frequency of the transmission signal may be considered as the local frequency of a signal generated in the multiband generator, and in the transmission signal on the frequency axis, a modulation signal exists around the local frequency.

According to the above-mentioned configuration, timing is generated in which a signal with a predetermined local frequency is selected in a set time period and a signal with any of all local frequencies is not selected in a different set time period. By switching a correction value while the LO frequency stops, a change of the correction value does not appear on the mixer output, and generation of an unnecessary wave is suppressed.

The other exemplary embodiment of the transmission signal processing circuit according to the present invention is characterized by including a transconductance element and a first D/A converter in addition to the above-mentioned configuration. The transconductance element converts a baseband voltage signal into a current signal. The first D/A converter changes a differential bias current of the transmission mixer and connects the current output to an current output of the transconductance element.

Hereinafter, it is described why the first D/A converter changes a differential bias current and on which is based. This is because in order to reduce LO (local) leakage, the differential bias current is changed based on a detection result of an amplitude detecting part 802 in FIG. 17 which is mentioned below.

Further, a concrete example of the transconductance element is a MOSFET (Field Effect Transistor). Additionally, a bipolar transistor or JFET (Junction Field Effect Transistor) is also available.

In the other exemplary embodiment of the transmission signal processing circuit according to the present invention, a plurality of switches have a plurality of blocks, each of which includes a first transconductance element and a first switching element, and also have a load impedance connected with a plurality of blocks. An output of the multiband generator is connected with a control terminal of the first transconductance element, and a series connection is provided so that an output current of the first transconductance element may flow to the load impedance component via the first switching element.

Here, a concrete example of the impedance component is an inductor. Even a resistor may be enough and an arbitrary combination of series or parallel connection of an inductor, a resistor and a capacitor (the capacity) may also be fine.

In the other exemplary embodiment of the transmission signal processing circuit according to the present invention, a plurality of switches have a plurality of blocks, each of which includes first and second transconductance elements, first and second switches and a first impedance component, and also have a load impedance connected with a plurality of blocks. An output of the multiband generator is connected with one end of the first switch, and the other end of the first switch is connected with a control terminal of the first transconductance element and one end of the second switch and one end of the first impedance component. Each of the other ends of the second switch and the first impedance component is connected with a bias voltage, and a series connection is provided so that an output current of the first transconductance element may flow to the load impedance component via an output of the second transconductance element.

The other exemplary embodiment according to the present invention relates to a receiving signal processing circuit which converts a receiving signal and a signal of a plurality of local frequencies generated by a multiband generator into a baseband signal by a receiving mixer. The receiving signal processing circuit is provided with a timing generation means and a plurality of switches. The timing generation means suspends generation of timing in which selection of all local frequencies is stopped. The switches switch over a signal with the local frequency from each multiband generator to the receiving mixer by an instruction from the timing generation means.

Here, the receiving mixer may be regarded as a detector or a demodulator, and it also may be regarded as a frequency converter or a down converter.

According to the above-mentioned configuration, generating the timing to stop selecting a signal with any of all local frequencies is suspended. That is, it becomes possible to suppress a change in self mixing of the receiving mixer by suspending generating the timing not to select a signal with any of all local frequencies (a state that all local signals are not supplied to the transmission mixer). Thereby, occurrence of DC offset can be suppressed in processing the receiving signals.

The other exemplary embodiment of the receiving signal processing circuit according to the present invention is characterized by including an amplifier circuit which amplifies an output of the receiving mixer and the second D/A converter which changes an offset voltage of the amplifier circuit in addition to the above-mentioned configuration.

Also, it is described why the second D/A converter changes the offset voltage on which is based. This is because in order to remove DC offset of the receiving mixer, the offset voltage is changed based on an output of an offset detecting part 814 in FIG. 17 which is mentioned below.

In the other exemplary embodiment of the receiving signal processing circuit according to the present invention, a plurality of switches have a plurality of blocks, each of which includes a first transconductance element and a first switching element, and also have a load impedance connected with a plurality of blocks. An output of the multiband generator is connected with a control terminal of the first transconductance element, and a series connection is provided so that an output current of the first transconductance element may flow to the load impedance component via the first switching element.

In the other exemplary embodiment of the receiving signal processing circuit according to the present invention, a plurality of switches have a plurality of blocks, each of which includes first and second transconductance elements, first and second switches and a first impedance component, and also have a load impedance connected to a plurality of blocks. An output of the multiband generator is connected with one end of the first switch, and the other end of the first switch is connected with a control terminal of the first transconductance element and one end of the second switch and one end of the first impedance component. Each of the other ends of the second switch and the first impedance component is connected with a bias voltage, and a series connection is provided so that an output current of the first transconductance element may flow to the load impedance component via an output of the second transconductance element.

The other exemplary embodiment according to the present invention relates to a transmission and receiving signal processing circuit which converts a signal with one of a plurality of local frequencies generated by a multiband generator and a baseband signal generated by a signal generator into a transmission signal by a transmission mixer, and converts a receiving signal and a signal with one of a plurality of local frequencies generated by the multiband generator into a baseband signal by a receiving mixer. The transmission and receiving signal processing circuit is provided with a timing generation means and a plurality of switches. The timing generation means generates timing to select a signal with a predetermined local frequency in a set time period and not to select a signal with any of all local frequencies in a different set time period in transmitting, and suspends generating timing in which selecting one from all local frequencies is stopped in receiving. The switches switch over a signal with the local frequency travelling from each multiband generator to the transmission mixer by an instruction from the timing generation means in transmitting, and switch over a signal with the local frequency travelling from each multiband generator to the receiving mixer by an instruction from the timing generation means in receiving.

According to the above-mentioned configuration, timing is generated in which to select a signal with a predetermined local frequency in a set time period and not to select a signal with any of all local frequencies in a different set time period. Therefore, by switching a correction value while the LO frequency stops, a change of the correction value does not appear on the mixer output, and generation of an unnecessary wave is suppressed. Also, by suspending generation of timing not to select a signal with any of all local frequencies, it becomes possible to suppress a change of self mixing in the receiving mixer, and as a result, occurrence of DC offset can be suppressed in processing receiving signals.

The other exemplary embodiment of the transmission and receiving signal processing circuit according to the present invention is provided with a transconductance element, a first D/A converter, an amplifier circuit and a second D/A converter in addition to the above-mentioned configuration. The transconductance element converts a baseband voltage signal into a current signal. The first D/A converter changes a differential bias current of the transmission mixer and connects the current output to an current output of the transconductance element. The amplifier circuit amplifies an output of the receiving mixer. The second D/A converter changes an offset voltage of the amplifier circuit.

In the other exemplary embodiment of the transmission and receiving signal processing circuit according to the present invention, a plurality of switches have a plurality of blocks, each of which includes a first transconductance element and a first switching element, and also have a load impedance connected with a plurality of blocks. An output of the multiband generator is connected with a control terminal of the first transconductance element, and a series connection is provided so that an output current of the first transconductance element may flow to the load impedance component via the first switching element.

In the other exemplary embodiment of the transmission and receiving signal processing circuit according to the present invention, a plurality of switches have a plurality of blocks, each of which includes first and second transconductance elements, first and second switches and a first impedance component, and also have a load impedance connected with a plurality of blocks. An output of the multiband generator is connected with one end of the first switch, and the other end of the first switch is connected with a control terminal of the first transconductance element and one end of the second switch and one end of the first impedance component. Each of the other ends of the second switch and the first impedance component is connected with a bias voltage, and a series connection is provided so that an output current of the first transconductance element may flow to the load impedance component via an output of the second transconductance element.

The other exemplary embodiment according to the present invention relates to a signal processing method in a signal processing circuit which has a plurality of switches controlling a mixer, a plurality of local signals, and passage of the local signal to a local port of the mixer, and a D/A converter changing a differential bias current flowing into the mixer. The signal processing method of the signal processing circuit has the processes of a first processing to turn on a predetermined switch in a plurality of switches, a second processing to wait the switching operation for a predetermined time period T1, a third processing to turn off all of a plurality of switches, a fourth processing to switch over a setting value of the D/A converter and a fifth processing to wait the switching operation for a predetermined time period T2.

Here, T1 corresponds to time (symbol time) for example indicated by 1401 in FIG. 2A, and is about 300 ns. T2 is an idle time period between a symbol and a symbol, and is a guard interval, about 10 ns. T21 and T22 share a time period of the guard interval half, and about 5 ns respectively.

According to the above-mentioned configuration, by the first processing to turn on a predetermined switch in a plurality of switches, the second processing to wait the switching operation for a predetermined time period T1, and the third processing to turn off all of a plurality of switches, a change of a correction value does not appear on the mixer output, and as a result, generation of an unnecessary wave is suppressed. Also, by the fourth processing to switch over a setting value of the D/A converter and the fifth processing to wait the switching operation for a predetermined time period T2, it becomes possible to suppress a change of self mixing in the receiving mixer, and as a result, occurrence of DC offset can be suppressed in processing receiving signals.

The other exemplary embodiment according to the present invention relates to a signal processing method in a signal processing circuit including a plurality of switches controlling a mixer, a plurality of local signals, and passage of the local signal to a local port of the mixer, and a D/A converter changing a differential bias current flowing into the mixer. The signal processing method in the signal processing circuit has the processes of a first processing to turn on a predetermined switch in a plurality of switches, a second processing to wait the switching operation for a predetermined time period T1, a third processing to turn off all of a plurality of switches, a fourth processing to wait the switching operation for a predetermined time period T21, a fifth processing to switch over a setting value of the D/A converter and a sixth processing to wait the switching operation for a predetermined time period T22.

According to the above-mentioned configuration, by the first processing to turn on a predetermined switch in a plurality of switches, the second processing to wait the switching operation for a predetermined time period T1, and the third processing to turn off all of a plurality of switches, a change of a correction value does not appear on the mixer output, and as a result, generation of an unnecessary wave is suppressed. Also, it has the fourth processing to wait the switching operation for a predetermined time period T21, the fifth processing to switch over a setting value of the D/A converter and the sixth processing to wait the switching operation for a predetermined time period T22. By these processing, it becomes possible to suppress a change of self mixing in the receiving mixer, and as a result, occurrence of DC offset can be suppressed in processing receiving signals.

<Sequential Circuit, Program and Storage Media>

The signal processing circuit of the present invention described above is, for example, a sequential circuit constructed of logic circuits, and can be realized by a programmable computer. The sequential circuit may be a circuit whose operation is specified in advance, or it may be a circuit whose logic and order can be modified As a computer, a microcontroller or a microprocessor on an integrated circuit or except the integrated circuit, DSP (digital signal processor), or multipurpose computer such as a personal computer and a workstation can be available.

That is, one exemplary embodiment of a recording medium which records a program according to the present invention relates to a recording medium which records a program for causing a computer to execute a processing to control a mixer, a plurality of local signals and passage of the local signal to a local port of the mixer, and a processing to change a differential bias current flowing into the mixer. The program recorded on this recording medium causes a computer to execute the processes of a first processing to turn on a predetermined switch in a plurality of switches, a second processing to wait the switching operation for a predetermined time period T1, a third processing to turn off all of a plurality of switches, a fourth processing to switch over a setting value of the D/A converter and a fifth processing to wait the switching operation for a predetermined time period T2.

According to the above-mentioned configuration, by the first processing to turn on a predetermined switch in a plurality of switches, the second processing to wait the switching operation for a predetermined time period T1, and the third processing to turn off all of a plurality of switches, a change of a correction value does not appear on the mixer output, and as a result, generation of an unnecessary wave is suppressed. Also, by having the fourth processing to switch over a setting value of the D/A converter and the fifth processing to wait the switching operation for a predetermined time period T2, it becomes possible to suppress a change of self mixing in the receiving mixer, and as a result, occurrence of DC offset can be suppressed in processing receiving signals.

The other exemplary embodiment of the recording medium which records a program according to the present invention relates to a recording medium which records a program for causing a computer to execute a processing to control a mixer, a plurality of local signals and passage of the local signal to a local port of the mixer, and a processing to change a differential bias current flowing into the mixer. The program recorded on this recording medium causes a computer to execute the processes of a first processing to turn on a predetermined switch in a plurality of switches, a second processing to wait the switching operation for a predetermined time period T1, a third processing to turn off all of a plurality of switches, a fourth processing to wait the switching operation for a predetermined time period T21, a fifth processing to switch over a setting value of the D/A converter and a sixth processing to wait the switching operation for a predetermined time period T22.

According to the above-mentioned configuration, by the first processing to turn on a predetermined switch in a plurality of switches, the second processing to wait the switching operation for a predetermined time period T1, and the third processing to turn off all of a plurality of switches, a change of a correction value does not appear on the mixer output, and as a result, generation of an unnecessary wave is suppressed. Also, by having the fourth processing to wait the switching operation for a predetermined time period T21, the fifth processing to switch over a setting value of the D/A converter and the sixth processing to wait the switching operation for a predetermined time period T22, it becomes possible to suppress a change of self mixing in the receiving mixer, and as a result, occurrence of DC offset can be suppressed in processing receiving signals.

As a result, wherever a computer environment executing a program is available, a processing circuit of the present invention can be realized. Such program may be stored in a computer readable recording medium. Here, as a recording medium, for example, a computer readable storage medium such as a CD-ROM (Compact Disc Read Only Memory), a flexible disc (FD), a CD-R (CD Recordable) or DVD (Digital Versatile Disk) or the like, a semiconductor memory such as a flash memory, RAM (Random Access Memory), ROM (Read Only Memory) or Fe RAM (ferroelectric memory) or the like, and HDD (Hard Disc Drive) can be cited.

Further, each exemplary embodiment mentioned above indicates an example of the preferred exemplary embodiment of the present invention, however, the present invention is not limited to these embodiments and various changes can be made without departing from the scope of the present invention.

[Features of the Invention]
FIG. 4 is an example of a block diagram of the transmission signal processing circuit as the signal processing circuit according to the present invention. The signal processing circuit of the present invention has the multiband generator 104, a plurality of switches 105-107, the timing generator 108 as the timing generation means, the transmission mixer 110 and the first D/A converter 112. The multiband generator 104 generates a plurality of local frequencies. The switches 105-107 switch over a plurality of local frequencies. The timing generator 108 generates timing to select a predetermined local frequency in a set time period and not to select all local frequencies in a different set time period. The transmission mixer 110 is connected with a plurality of switches, and performs frequency conversion for converting a baseband signal into a transmission signal. The first D/A converter 112 changes a differential bias current of the transmission mixer.

Because it is not desirable for the receiving mixer 810 that there is a time period during which all local frequencies are not selected, the timing generator 108 suspends to generate the timing in which all local frequencies are not selected in receiving.

Further, the transmission mixer 110 has the transconductance element 301 which converts a baseband voltage signal into a current signal, the first D/A converter 112 has an current output, and the current output of the D/A converter is connected with an current output of the transconductance element 301.

Moreover, a plurality of switches 105-107 have a plurality of blocks, each block includes the first transconductance element 601 and the first switching element 602, and the load impedance 603 which is connected with a plurality of blocks. In a plurality of switches 105-107, the output of the multiband generator is connected with a control terminal of the first transconductance element, and a series connection is provided so that the output current of the first transconductance element 601 may flow to the load impedance component via the first switching element.

[Functions]
The multiband generator 109 generates a plurality of LO frequencies for hopping, and a plurality of switches 105-107 switch over those LO frequencies and give to the LO port of the transmission mixer 110. The timing generator 108 generates timing in which all LO frequencies are not given to the transmission mixer in switching over the LO frequency. The first correction D/A converter 112 switches over a correction value while all LO frequencies stop.

By switching over a correction value while the LO frequency stops, a change of the correction value does not appear on the mixer output, and as a result, transmission of an unnecessary wave (so-called a transmission spurious signal) is suppressed. The timing generator 108 can suppress a change of self mixing in the receiving mixer 810 and also can suppress a change in DC offset by suspending generation of timing not to select all local frequencies in receiving. By connecting the current output of the first D/A converter 112 to the output of the transconductance element 301 of the transmission mixer 110, the LO leakage can be corrected and the noise such as a spike existing on the D/A converter output can also be reduced, and as a result, occurrence of the transmission spurious signal can be suppressed.

Further, in a plurality of switches 105-107, a series connection is provided so that the output current of the first transconductance element 601 may flow to the load impedance component 603 via the first switching element 602. Thereby, isolation between an input frequency to the switch and an output of the switch can be improved, and occurrence of the transmission spurious signal can be suppressed. The reason why occurrence of the transmission spurious signal can be suppressed is because two capacities between terminals, that is, a capacity between terminals of the transconductance element and a capacity between terminals of the switching element, are inserted between the frequency input and the switching output. Further, if the transconductance (gm) that is an amplification degree of the transconductance element is increased, this leads to suppressing increase of parasitic capacity seen from the output, and it becomes possible to amplify the LO frequency and to switch over in a very high-speed. Here, gm means transconductance. Hereinafter, the present invention is described in detail based on each example below.

EXAMPLE 1

Next, an example of the present invention is described in detail with reference to drawings. FIG. 4 is a block diagram showing a configuration of the example 1 of the transmission signal processing circuit as the signal processing circuit according to the present invention. This transmission signal processing circuit has a multiband generator 104, a plurality of switches 105-107, a timing generator 108, a transmission mixer 110 and a first D/A converter 112. The multiband generator 104 generates a plurality of local frequencies. The switches 105-107 switch over a plurality of local frequencies. The timing generator 108 generates timing to select a predetermined local frequency in a set time period and not to select all local frequencies in a different set time period. The transmission mixer 110 is connected with a plurality of switches, and performs frequency conversion for converting a baseband signal into a transmission signal. The first D/A converter 112 changes a differential bias current of the transmission mixer.

A signal generator 111 which generates a baseband signal is connected to the baseband port of the transmission mixer 110. This transmission signal processing circuit is further provided with a controller 109 which controls timing of the timing generator 108 and starts conversion of the first D/A converter 112. Conversion of the first D/A converter 112 may be started by the timing generator 108 (a broken line arrow in FIG. 4). Although the implementation of the controller 109 is realized by a programmable CPU (Central Processing Unit) which is not illustrated, it may also be realized by a hard logic constructed of logic gates.

EXAMPLE 2

FIG. 5 is a block diagram showing other example of the transmission signal processing circuit shown in FIG. 4. A difference between the transmission signal processing circuit shown in FIG. 5 and that in FIG. 4 is that three independent oscillators 101-103 are provided as the multiband generator 104. The oscillator 101 oscillates a signal with a frequency f1, the oscillator 102 oscillates a signal with a frequency f2 and the oscillator 103 oscillates a signal with a frequency f3. By the instruction from the timing generator 108, it is possible to input a signal with any one of frequencies to the transmission mixer 110 by switching over the switches 105-107. As a circuit configuration of the oscillators 101-103, for example, PLL (Phase Locked Loop) using LC-VCO (voltage controlled oscillator constructed of L and C) can be used.

EXAMPLE 3

FIG. 6 is a detailed circuit of the transmission mixer 110 and the first D/A converter 112 shown in FIG. 4. The transmission mixer 110 includes a transconductance element (gm device) 301 which converts a baseband voltage signal into a current signal, a gm device 302 which converts an LO voltage signal into a current signal and a load impedance 303.

The gm device has a control terminal, a reference terminal and an output terminal, and each of these corresponds to a gate terminal, a source terminal and a drain terminal respectively comparing to FET (Field Effect Transistor). In the case of a bipolar transistor, each of these corresponds to a base, an emitter and a collector respectively. A baseband signal from the signal generator 111 (refer to FIG. 4) is inputted to the control terminal of the gm device 301, and the reference terminal is connected with a power supply. The output terminal of the gm device 301 is connected with a ground terminal of the gm device 302. The LO signal selected by the switches 105-107 is inputted to the control terminal of the gm device 302, and the output terminal is connected with the load impedance 303.

The first D/A converter 112 includes a plurality of gm devices 304. A plurality of gm devices 304 give weighting so as to change its output current value, for example, in binary. That is, it can be realized by arranging a plurality of gm devices, in which each of the output currents is changed to become two times, four times, 8 times and so forth compared with a minimum value of the output current. The control terminal of the gm device 304 is connected with the controller 109 which sets a correction value of the DAC, and the reference terminal is connected with a power supply. The output terminal of each gm device is connected together with other output terminals, and connects with the output terminal of the gm device 301 on the baseband port of the transmission mixer 110 mentioned above. By making the cascode configuration in which two of the gm devices are connected in series, the dependence of the output current on an operating point can be obviously reduced.

EXAMPLE 4

FIG. 7 is an example which replaces other gm devices in the transmission mixer 110 and the first D/A converter 112 shown in FIG. 6 with MOS (Metal Oxide Semiconductor) FET. The current which flows on the control terminal can be made approximately zero by using MOSFET as FET. A bipolar transistor which can reduce occurrence of LO leakage can also be used as the gm device.

EXAMPLE 5

FIG. 9A is the concrete circuit diagram of the timing generator 108, and FIG. 9B is a timing chart of the input signals of FIG. 9A, and FIG. 9C is a timing chart of the output signals of FIG. 9A. Each terminal of switches SW5-SW7 is connected to the controller 109 (refer to FIG. 4) which controls frequency hopping. The timing generator 108 generates a time period during which all local frequencies are not selected by taking logical sum, in the AND gate (AND 502), between a signal which is the hopping control signal from the controller 109 with being delayed by the delay element 501 and a signal which is the hopping control signal itself without being delayed.

EXAMPLE 6

FIG. 10A is the concrete circuit diagram of the timing generator 108, and FIG. 10B is a timing chart of the input signals of FIG. 10A, and FIG. 10C is a timing chart of the output signals of FIG. 10A. The hopping control signal is received from the controller 109 like a case of FIGS. 9A-9C, and a timing signal TX indicating a period for transmitting is also received. By taking logical sum, in the AND gate (AND 503), between the TX signal and the delayed signal mentioned above, the timing generator 108 generates a time period during which all local frequencies are not selected in transmitting. On the other hand, generation of the time period is suspended in receiving. In other words, the timing for switching over the LO frequency continuously is generated.

EXAMPLE 7

FIG. 11 is the first example of the switches 105-107 shown in FIG. 4. The switch has a plurality of blocks (indicated by a wavy line), each block includes the first transconductance element 601 and the first switching element 602, and it also has a load impedance 603 connected with a plurality of blocks. The output of the multiband generator 104 or oscillators 101-103 is connected with the control terminal of the first transconductance element 601. It is connected in series so that the output current of the first transconductance element may flow to the load impedance component via the first switching element. This example is an example of the single end switch, so-called non-equilibrium switch.

EXAMPLE 8

FIG. 12 is the second example of the switches 105-107 shown in FIG. 4 and shows the differential operation switch, so-called equilibrium switch. Like a case in FIG. 11, the switch has a plurality of blocks including the first transconductance element 611, the first switching element 612, the second transconductance element 614, the second switching element 615 and the first current source 617. The first and the second load impedances 613 and 616 that are connected with a plurality of blocks are provided.

A non-inverted output (true) of the multiband generator is connected with the control terminal of the first transconductance element 611. They are connected in series so that the output current of the first transconductance element 611 may flow to the first load impedance component 613 via the first switching element 612. An inverted output (bar) of the multiband generator is connected with the control terminal of the second transconductance element 614. They are connected in series so that the output current of the second transconductance element may flow to the second load impedance component 616 via the second switching element 615. The reference terminals of the first transconductance element 611 and the second transconductance element 614 are joined together and connected with the first constant-current source 617.

EXAMPLE 9

FIG. 13 is the third example of the switches 105-107 shown in FIG. 4, and it has a configuration which enhances the isolation between LO frequencies compared with the switch in the first example. The switch has a plurality of blocks including the first and the second transconductance elements 621 and 622, the first and the second switches 624 and 625 and the first impedance component 626. The switch has the load impedance 623 which is connected with a plurality of blocks, and the output of the multiband generator is connected with one end of the first switch. The other end of the first switch is connected with the control terminal of the transconductance element, one end of the second switch and one end of the first impedance component. Each of the other ends of the second switch and the first impedance component is connected with the bias voltage, and they are connected in series so that the output current of the first transconductance element may flow to the load impedance component via the second transconductance element. This example illustrates the single end switch, so-called non-equilibrium switch.

EXAMPLE 10

FIG. 14 is the fourth example of the switches 105-107 shown in FIG. 4, and has the differential operation switch, so-called equilibrium switch, which is transformed from the switch in the third example. The switch configuration in the third example of the switch comprises two switch systems of the inversion and the non-inversion, and each switch block has one current source respectively which determines total current in two systems.

EXAMPLE 11

Next, operation of an example of the signal processing circuit according to the present invention is described in detail. In the multiband OFDM signal (MB-OFDM signal, UWB signal adopted by the WiMedia standardization), there is a mode which performs frequency hopping among three frequencies (f1, f2 and f3) of the LO frequency at high speed as shown in FIG. 3A. Fourteen bands are assigned between 3.1-10.6 GHz in the multiband OFDM signal, and frequency hopping is usually performed among the continued three bands. Multi-access is controlled by the hopping sequence, and there are several hopping sequences such as a case of hopping from frequency f1 to f2, or a case of hopping from frequency f1 to f3.

FIG. 18A indicates the operation waveforms around the transmission mixer which is used for the transmission signal processing circuit shown in FIG. 4, and FIG. 18B is a figure representing the operation waveforms around the transmission mixer used for the transmission signal processing circuit in relation to the present invention. They are magnified figures of the timing portion during which frequency hops from f1 to f2. The LO frequencies f1 and f2 are selected and inputted to the LO port of the transmission mixer 110 by the control signals s1 and s2 from the timing generator 108.

In FIG. 18A, a falling edge of the hopping control signal s1 and a rising edge of the control signal s2 are the same timing, and stop timing of oscillation in frequency f1 and start timing of oscillation in frequency f2 are the same. As it has been described in FIGS. 3A and 3B, when a signal of frequency LO is added to the transmission mixer, the LO leakage (leakage of the carrier frequency) arises from the transmission mixer output due to imperfection of the mixer and its periphery. Since the LO leakage is also generated by DC offset existing on the BB (baseband) port, the LO leakage can be converted into the offset amount of the BB input. The LO leakage can almost be corrected by giving a compensation amount to cancel this offset amount converted into BB input.

However, there exists a timing difference and a difference in the inclination of the changed voltage waveform between the offset amount converted into BB input and the compensation amount, and the noise like that in FIG. 18A arises in the mixer output in switching the frequency.

In each signal of the signal processing circuit according to the present invention, as shown in FIG. 18B, there exists a timing difference between a falling edge of the hopping control signal s1 and a rising edge of the control signal s2. As a result, there is a time gap from stopping oscillation with frequency f1 to starting oscillation with frequency f2, and nothing is added as the LO signal in this time period. By this, the offset converted into input becomes nearly zero in this time period.

Because the product of the LO port and the BB port arises on the transmission mixer output, if the LO port is a zero, even if the compensation amount inputted to the BB port has changed, nothing appears on the mixer output. In a time period while a signal with f1 frequency or a signal with f2 frequency is added, the LO leakage is converted into the input offset amount like that in FIG. 18A, and the LO leakage can be corrected by adding the correction amount with a reversed sign.

However, in a practical situation, ideal isolation from the BB port to the mixer output cannot be obtained, and when a steep pulse is inputted to the BB port, that appears on the mixer output. Driver amplifiers (power amplifiers) with high gain exist on the mixer output and many of them have the single end type configuration, which also becomes a cause of amplifying a steep change. That is, it is because a pulse can be transmitted via a substrate. In the output terminal of the mixer and these amplifiers, in order to increase the gain, a tank circuit (resonant circuit) using L and C is used. In UWB system, the coefficient of the tank circuit is chosen so that it may resonate around 3-10 GHz, a low band of 3-5 GHz or a high band of 6-10 GHz. If the spectrum which is obtained by carrying out frequency decomposition for the correction pulse inputted to the BB port contains these frequency regions, ringing (with damping) is caused like the time when the step function is inputted to the resonant circuit constructed of LC.

FIG. 19A indicates the states at that time, and the mixer output having an inductor load generates ringing due to a steep change of the correction amount or a change of the correction amount with a spike. This ringing frequency is surely located in-band of UWB, which is tuned so as to get high gain, and passes through the transmission BPF (Band Pass Filter) and causes occurrence of an unnecessary wave.

Here, FIG. 19A indicates each signal when a spike occurs in the signal processing circuit. FIG. 19B indicates each signal when a spike does not occur in the signal processing circuit.

In contrast, in the signal processing circuit according to the present invention shown in FIG. 7, in order to suppress occurrence of an unnecessary wave also for this spike of the correction amount, the output of the correction DAC has an current output, and the current output is connected with the output terminal of the gm device 301 in the BB port. It is connected with a drain of an nMOS transistor here. By this, the output current of the gm device 301, which converts the main signal voltage into a current signal, and the correction DAC current are added, and are inputted to the reference terminal (in this case, source terminal) of the gm device 302 on the LO port, and frequency conversion (up conversion) is performed by being multiplied by the LO signal.

At the time of this frequency conversion, relatively large parasitic capacity Cp exists at the output terminal (drain terminal) of the gm device in the BB port, and an integrating circuit is constituted by this Cp and the correction DAC current output. The states at this time are shown in FIGS. 8A and 8B.

FIG. 8A is the integrating circuit consists of the parasitic capacity Cp and the correction DAC current output, and FIG. 8B is a figure showing the frequency-amplitude characteristics of the integrating circuit shown in FIG. 8A. In FIG. 8B, a horizontal axis indicates frequency and a vertical axis indicates amplitude. iDAC represents the output current of the correction DAC. gm2 represents the transconductance gm of the gm device 302 in the LO port. LPF (low pass filter) whose cutoff frequency is determined by a reciprocal of this transconductance gm2 and the parasitic capacity Cp can be constituted.

Under ordinary circumstances, it would have become a correction amount with a spike like the correction amount shown in FIG. 19A, however, by this configuration, a correction amount which has reduced the high frequency components can be obtained as shown in FIG. 19B, and occurrence of an unnecessary wave on the mixer output and the driver amplifier output can be suppressed. By making an idle time period of the LO signal mentioned above, in combination with the effect that can reduce LO leakage, the signal processing circuit which has reduced an unnecessary wave (transmission spurious signal) can be constituted.

Here, instead of this correction DAC, a correction signal can be produced in the DAC which generates a main signal (surely OFDM signal in case of MB-OFDM,) inputted to the baseband ports (BB+ or BB-) in FIG. 6 or FIG. 7. However, the LO signal is usually requested to be corrected in minute scales, and there is a problem that the main signal DAC should be provided with high resolution if a correction signal is produced in the main signal DAC.

For example, the resolution usually required for the main signal DAC of MB-OFDM is approximately 6 bits, however, it needs about 10 bits of resolution if it combines with correction of LO leakage. Moreover, from the main signal DAC to the transmission mixer, there exist LPF and amplifiers, and DC couplings are necessary for all those, and as a result, there is a problem to become weak to DC drift caused by chip temperature change. As the connection of the correction DAC in the present invention does not involve such problems and an integral effect can also be expected, it is the most suitable configuration of the signal processing for removing the LO leakage.

Although one correction DAC 112 (differential configuration) is provided in FIG. 6 and FIG. 7, it is possible to provide the same number of correction DACs as the number of frequencies involved in frequency hopping. The LO leakage in each frequency can be corrected by switching over a plurality of correction DACs by a selector at high speed in accordance with frequency hopping. The selector is arranged between a plurality of correction DACs and the transmission mixer, and switches over the selected correction DAC in accordance with the frequency hopping. Because each correction DAC does not need to change a correction value while frequency hopping if the correction value has been determined, relatively low-speed correction DAC can be used. Even so, when the selector is switched over, the correction amount overshoots, ringing is generated, or a control signal of the selector plunges into an output of the selector, as a result, a spike-like noise arises. In case of this noise, it is also possible to take a measure by the present invention.

In generation of an idle time period of the LO signal, it is better to perform at the timing of FIGS. 9B and 9C based on a configuration shown in FIGS. 9A-9C. FIG. 9B shows the timing inputted to the timing generator. In this example, the LO frequency f1 is stopped, and a change in each signal around the frequency hopping from f2 to f3 is indicated. By the instruction from the controller 109 or the like, the SW5 signal changes from a high state to a low state and instructs to stop a signal of the frequency f2. The SW6 changes from a low state to a high state in the same timing as this change, and instructs to start a signal of the frequency f3. However, the timing generator delays this start timing for a predetermined time period (td). This is because the changing from high to low of the SW5 is transmitted to the SW5A just as it is by the function of the AND gate as indicated in FIGS. 10A and 10C, however, the changing from low to high of the SW6 is delayed by the delay time td of the delay element 501.

These signals from SW5A to SW7A are added to the control terminal of the switches 105-107 indicated in FIG. 4 or the like. By this, it can be delayed when the LO signal with f3 frequency is added to the LO port of the transmission mixer for a time period which is determined by the delay time td, and a time period during which the LO signal is not added at all can be generated. In the MB-OFDM (WiMedia) standard, each symbol performing frequency hopping is separated from other symbol by about 70 ns. On the other hand, in order to perform the cyclic prefix processing using electric power of the delayed wave in a receiving end, a short time less or equal to about 10 ns is required as a switching over time of frequency hopping.

FIG. 21A is a timing chart in the signal processing circuit in relation to the present invention, and FIG. 21B is a timing chart in the signal processing circuit according to the present invention. In timing of the related art, there is no idle time period among the signals (gate signals when the switch is MOSFET) added to the control terminal of the switches 105-107. Therefore, for example, the gate signal of the switch 107 (SW7) which switches the LO signal with the frequency f3 turned on simultaneously at the timing when the gate signal of the switch 106 (SW6) which switches the LO signal with the frequency f2 turns off. The change in the correction amount was also steep and there was a spike as shown in FIG. 21A.

As shown in FIG. 5, in the present invention, the switch 106 which is connected with the oscillator 102 with the frequency f2 turns off, and after passing the time period of td, the switch 107 which is connected with the oscillator 103 with the frequency f3 turns on. The correction amount is integrated by the configuration shown in FIG. 6 and FIG. 7, and it becomes a signal in which high frequency components are suppressed as shown in FIG. 24B.

EXAMPLE 12

FIG. 22 is a flowchart illustrating a selecting operation of an LO frequency and a suspended operation of all LO frequencies. The timing generator 108 (refer to FIG. 4) is a subject which generates timing for the switches. Accordingly, in processing of the flowchart, the timing generator 108 generates timing by an instruction from the controller 109 (refer to FIG. 4). By an instruction of the controller 109, the timing generator 108 generates timing. The controller 109 controls the whole transmitting and receiving apparatus widely. The signal source N (X) represents the Xth LO frequency. In Step 1201, the X is set at 1. In Step 1202, the switch (the switch 105, for example) of the first signal source N(1) is turned on, and LO frequency with the frequency f1 is selected, for example. In Step 1203, this state is held during a time period of T1 (WAIT). For example, the LO signal with the frequency f1 is being outputted. In Step 1204, the switches of all LO signal sources are turned off. For example, in FIG. 4, since there are three switches, all these three switches 105-107 are turned off. In Step 1205, this entire suspending state is held during a time period of T2 (WAIT). In Step 1206, X is incremented and returns to the 1202 processing. These Steps 1202-1206 are repeated for a predetermined number of times.

As the time period of T1, in the MB-OFDM signal, because a symbol time is approximately 300 ns, T1 can be equivalent to this symbol time or a little longer. The time period of T2 corresponds to the time period of td in FIG. 9 (c). Because the time interval between symbols is approximately 70 ns in the MB-OFDM signal, the time period of T2 can be equivalent to this interval time or a little shorter. By such processing, occurrence of unnecessary spurious signal is suppressed in processing the transmission signal, and occurrence of DC offset is suppressed in processing the receiving signal. Although a software processing is performed in this example, the present invention is not limited to this, and it may be a processing by a sequential circuit by hard logics.

EXAMPLE 13

FIG. 23A is a flowchart in which Step 1207 of processing for switching over a correction amount is added to the flowchart shown in FIG. 22. FIG. 23B is a flowchart in which Step 1204 of the flowchart shown in FIG. 22 is replaced by the step of turning off the SWs on all signal lines and switching over a correction amount. It is better to perform this processing (Step 1217) after turning off all switches in Step 1204. After processing of Step 1217, there is the processing of Step 1205 which applies WAIT for only a time period of T2. It is better to determine the time period of T1 so as to start switching over a correction amount while all LO signals are stopped, and move to the next processing when a change in an integrated correction amount has converged. Processing in Step 1204 and processing in Step 1207 can be performed simultaneously as processing in Step 1217 as shown in FIG. 23B. By such processing, occurrence of unnecessary spurious signal is suppressed in processing the transmission signal, and occurrence of DC offset is suppressed in processing the receiving signal. Although a software processing is performed in this example, the present invention is not limited to this, and it may be a processing by a sequential circuit by hard logics.

EXAMPLE 14

FIG. 24 is a flowchart in which Step 1215 of processing to apply WAIT for only a predetermined time period of T21 is inserted in front of Step 1207 of processing to switch over a correction amount of the flowchart shown in FIG. 23, and processing of Step 1225 to apply WAIT for only a predetermined time period of T22 is inserted after Step 1207. By such processing, for example, it can be avoided that Step 1204 of processing to suspend all LO frequencies and Step 1207 of processing to switch over a correction amount are reversed in terms of time. By Step 1215 of applying WAIT for the predetermined time period of T21, it becomes possible not to cause this reverse even if there is on the chip a gate delay, a wiring delay, skew of gate and so on, and the correction amount can be switched over while all LO signals are suspended.

It is better to determine the time period of T22 which is a waiting time after switching over a correction amount so as to move to the next processing when a change in an integrated correction amount has converged. In case of MB-OFDM mentioned above, the total time of the time period of T21 and the time period of T22 can be set about 70 ns or shorter. By such processing, occurrence of unnecessary spurious signal is suppressed in processing the transmission signal, and occurrence of DC offset is suppressed in processing the receiving signal. Although a software processing is performed in this example, the present invention is not limited to this, and it may be a processing by a sequential circuit by hard logics.

EXAMPLE 15

FIG. 15 is a block diagram showing the configuration of the other example of the signal processing circuit according to the present invention.
Compared with the example 1, the signal processing circuit further has a switch 701 in which one end is connected with the bias voltage VB or the bias current IB, and has a timing generator 718 in which an timing output for controlling that switch is added. The other end of the switch 701, together with other switches 105-107, is connected with the LO port of the transmission mixer 110 as the frequency conversion part. Other components are the same as those of the example 1.

EXAMPLE 16

FIG. 16 is an example which indicates the concrete circuit of switches 105-107 and 701 used in the example shown in FIG. 15. In the example 2 of the switch shown in FIG. 12, one switch block is increased. To the control terminal of the gm device in the increased switch block, the bias voltage V0 has been added to both of non-inverting input and inverting input terminals.

As shown in FIG. 16, for example, in case of hopping the frequency from f2 to f3, the signal added to the control terminals from s1 to s4 of these switches 105-107 and 701 turns off the control signal s2, and at the same time, turns on the control signal s4. Then, after passing the time period of td mentioned above, the control signal s4 is turned off, and at the same time, the control signal s3 is turned on. As a result, the same bias current always flows to the load impedance Z, and it is possible to keep an operating point of output nearly constant.

EXAMPLE 17

FIG. 17 is a block diagram of the transmission and receiving signal processing circuit as the signal processing circuit according to the present invention. FIG. 17 is a configuration of the transceiver having a transmitter and a receiver. In the figure, TC shows the transmission signal processing circuit and RC shows the receiving signal processing circuit. The frequency generation part (multiband generator) 104, the controller 109 and the switching part 807 are common with the transmission signal processing circuit TC and the receiving signal processing circuit RC.

The same problem as a broadband transmitter also arises as a receiving DC offset in a direct conversion broadband receiver. As an origin of the receiving DC offset, there are variability of threshold value of transistors in the receiving mixer and self mixing phenomenon in which the LO signal plunges into the RF port or around LNA from the LO port. The self mixing phenomenon has the large frequency characteristics like LO leakage, and each DC offset amount arising around frequencies of f1, f2 and f3 does not become the same value. In other words, the correction is possible to some extent by applying the DC offset acquired in a certain LO frequency to other frequencies, however, an ideal correction cannot be performed.

Here, it is described why the first D/A converter changes a differential bias current and on which is based. In order to reduce LO (local) leakage, the differential bias current is changed based on a detection result of the amplitude detecting part 802 in FIG. 17. If LO leakage becomes excessive, it possibly exceeds the spectral mask and possibly degrades S/N of the signal. The Amplitude detecting part detects LO leakage. Because the LO leakage arises due to unbalance between differentials, it is possible to correct by returning unbalance to be balanced with changing the differential bias current. The differential bias is changed so that LO leakage detected by the amplitude detecting part becomes a minimum. These are usually applied to both of I pass and Q pass in the I/Q orthogonal modulator.

Also, it is described why the second D/A converter changes the offset voltage and on which is based. The offset voltage is changed in order to remove DC offset in the receiving mixer based on the output of the offset detecting part 814 in FIG. 17. If DC offset arises in the receiving mixer due to self mixing phenomenon, the signal processor 811 or the like subsequent to the receiving mixer is saturated, and it cannot process a signal normally. The second D/A converter (815 offset adjusting part 2) performs the correction based on a detection result of the offset detecting part 814, for example, so that DC offset of mixer output becomes approximately zero.

FIG. 20A is a timing chart showing each signal when switching over the compensation amount in the transmission and receiving signal processing circuit shown in FIG. 17. FIG. 20B is a timing chart showing each signal when providing an idle time period of LO signal in the transmission and receiving signal processing circuit shown in FIG. 17. At this time, as shown in FIG. 20A, the compensation amount is switched over according to the hopping of the DC offset amount as well as the transmission end. If there is time difference between timing of the DC offset changing and timing of the compensation amount changing, an impulse-like noise remains in the offset amount after correction. This problem can be handled by arranging LPF and an integrating circuit behind the receiving mixer, and removing this noise so as not to add noise to high gain VGA.

Also, as shown in FIG. 20B, there is a problem that the offset amount after correction is increased and the DC offset appears during the idle time period if the idle time period is provided for LO signal. That is, first, because the DC offset which is generated by self mixing or the like is disappeared by stopping LO signal with the frequency f1, the compensation amount applied for the correction appears as an offset.

Next, if a compensation amount is set for the LO signal with frequency f2, the compensation amount also appears as an offset because the LO signal with frequency f2 has not yet started. When the LO signal with frequency f2 starts, the DC offset by self mixing and the compensation amount are finally balanced, and the output DC offset after correction in the receiving mixer has become approximately zero.

For a pulsed offset remaining after correction, its amplitude and time after passing LPF (Low Pass Filter) and the integrating circuit provided in a subsequent stage can be minimized by making both the amplitude and the pulse width minimum. Therefore, it is desirable to have the processing in which LO frequency is not suspended in receiving.

The transceiver in FIG. 17 has the controller 109, the timing generator 108, the switching part 807, the switching part 805 and at least one antenna 806. The timing generator 108 generates timing to select a predetermined LO frequency in a set time period and not to select any of all LO frequencies in the different set time period, and suspends generation of timing not to select any of all LO frequencies in receiving. The switching part 807 includes a plurality of switches 105-107 or the like for switching over a plurality of local frequencies. The switching part 805 switches over the connection to transmission or receiving antenna. The timing generator 108 may be arranged outside the controller 109, or may be arranged inside the controller 109.

Further, the transceiver in FIG. 17 has, as the transmitter unit, the signal generator 111 which generates a baseband signal such as OFDM, the frequency conversion part 1 (110) as the transmission mixer, the power amplifier part 1 (801) as the transmission driver amplifier, the amplitude detecting part 802 which detects an amplitude of LO leakage and the offset adjusting part 1 (112) including the correction DAC or the like.

Further, the transceiver in FIG. 17 has, as the receiving unit, the signal processor 811 which performs receiving processing of a baseband signal such as OFDM or the like, the frequency conversion part 2 (812) as the receiving mixer, the power amplifier part 2 (813) which amplifies a receiving signal from the antenna 806, the offset detecting part 814 which detects a receiving DC offset and the offset adjusting part 2 (815) including the correction DAC or the like.

The offset adjusting part 2 works on the frequency conversion part 2 and the signal processing unit and generates a correction amount in accordance with the DC offset which varies depending on the frequency hopping. For detecting a correction amount, the offset detecting part 814 detects the DC offset in the signal detecting part.

A detailed example of the timing generator 108 is shown in FIGS. 10A-10C. The hopping signals SW5-SW7 are inputted from the controller 109 (refer to FIG. 17) like a case of FIGS. 9A-9C. This case is a hopping from frequency f2 to frequency f3. Similarly, a TX signal which indicates whether the transceiver is at the time of transmission or at the time of receiving is inputted from the controller 109. The TX signal becomes high (broken line of FIG. 10C) at the time of transmission, and as described in correction of LO leakage, the control signal SW6A of the switch 106 becomes low (non-selection), and the control signal SW7A of the switch 107 becomes high (selection) after the time period of td has passed during which any of all LO signals is not selected. On the other hand, the TX signal becomes low (solid line of FIG. 10C) in receiving, and after the control signal SW6A of the switch 106 becomes low (non-selection), the control signal SW7A of the switch 107 becomes high (selection) without generating the time period of td during which all LO signals are not selected.

By this, the signal processing circuit can be realized, which can minimize the LO leakage in transmitting, and can minimize the DC offset in receiving, and is excellent in the transmission spurious characteristics and the receiving S/N characteristics. The transmission spurious, for example in the MB-OFDM signal, needs to be set to approximately −41 dBm/MHz as EIRP, and it is necessary to make it approximately less than −50 dBm/MHz if margin or the like is considered. With respect to degradation of receiving S/N, it needs to be suppressed in the very small level of the mV level, as it is considered that a receiving signal at the antenna end is from −80 dBm to around −85 dBm, and a signal level after passing through the receiving amplifier 813 and the receiving mixer 813 becomes around −60 dBm.

[Effects]

The first effect is that it is possible to suppress occurrence of LO leakage with any frequency to which a hopping is performed in the transmitter which performs a fast frequency hopping. This is because a correction value of the DAC for correction can be changed at high speed in accordance with the hopping by adopting the configuration and the connections of the transmission mixer and the DAC as mentioned above.

The second effect is that it is possible to suppress occurrence of a transmission spurious signal other than LO leakage, as well as suppressing occurrence of LO leakage. This is also because the configuration and connections of the transmission mixer and the DAC have a noise removal effect, and the timing generation means provide a time period during which all LO frequencies are not selected in a selection of LO frequency.

The third effect is that it is possible to minimize increase of DC offset by self mixing in receiving, as well as suppressing occurrence of a transmission LO leakage. This is because the change in self mixing can be minimized by suspending generation of the time period during which all LO frequencies are not selected in receiving.

The fourth effect is that it is possible to suppress a frequency leakage other than the selected frequency in the hopping frequency. This is because the selected frequency is amplified and a leakage in not selected frequency can be suppressed due to the configuration of the switch as mentioned above. Further, it is possible to switch over the hopping frequencies at high speed.

FIELD OF INDUSTRIAL APPLICATION

The present invention can be used for a signal processing technical field which processes a high bandwidth signal such as an ultra wideband (UWB) or the like, for example, a transmission circuit, a receiving circuit, a transmitter-receiver and a repeater or the like.

BRIEF DESCRIPTION OF THE DRAWINGS

FIG. 2A is a figure showing the frequency characteristics at the time of transmission in a transmitter in relation to the present invention, and 2B is a figure showing the characteristics of the local frequency in the transmitter in relation to the present invention.

FIG. 3A is a block diagram of a transmitter in relation to the present invention, and 3B is a timing chart of each of hopping control signals, LO signal, an output of a transmission mixer before compensation, a value which LO leakage is converted into the offset amount of the BB input, a compensation amount and the output of the transmission mixer after compensation of the transmitter shown in 3A.

FIG. 9A is a circuit diagram in detail of the timing generator 108, and 9B is a timing chart of the input signals of 9A, and 9C is a timing chart of the output signals of (a).

FIG. 17 is a block diagram of a transmission and receiving signal processing circuit as the signal processing circuit according to the present invention.

FIG. 19A indicates each signal when a spike occurs in the signal processing circuit, and 19B indicates each signal when a spike does not occur in the signal processing circuit.

FIG. 20A is a timing chart showing each signal when switching over the compensation amount in the transmission and receiving signal processing circuit shown in FIGS. 17, and 20B is a timing chart showing each signal when providing an idle time period of LO signal in the transmission and receiving signal processing circuit shown in FIG. 17.

FIG. 21A is a timing chart in the signal processing circuit in relation to the present invention, and 21B is a timing chart in the signal processing circuit according to the present invention.

DESCRIPTION OF THE CODES

Figure 1B:
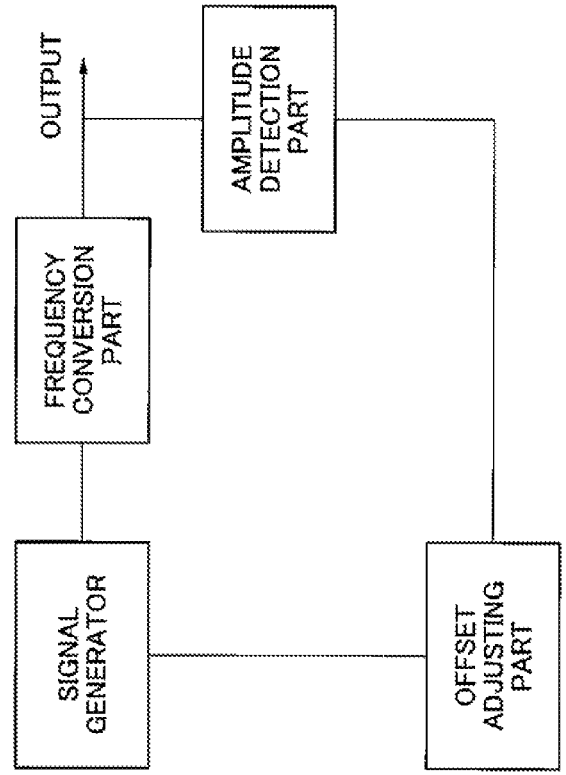
FIG. 1A is an example of a block diagram of a transmitter in relation to the present invention, and 1B is other examples of a block diagram of a transmitter in relation to the present invention, and 1C is an example of a block diagram of a receiver in relation to the present invention.
Figure 1A:
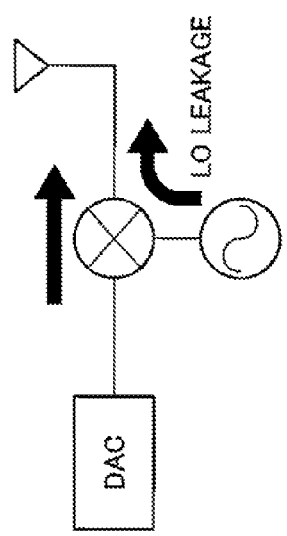
Figure 1C:
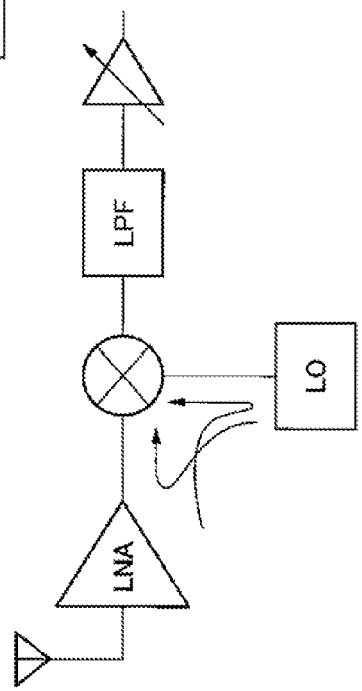
Figure 4:
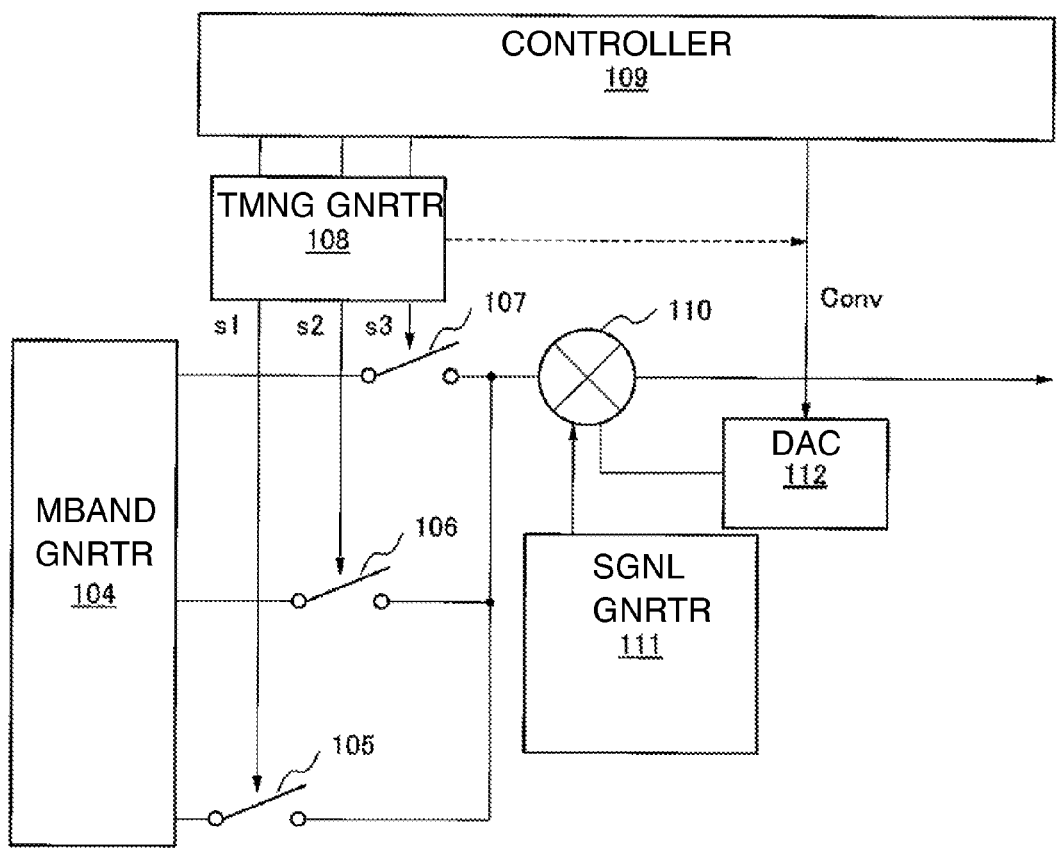
FIG. 4 is an example of a block diagram of a transmission signal processing circuit as a signal processing circuit according to the present invention.
Figure 5:
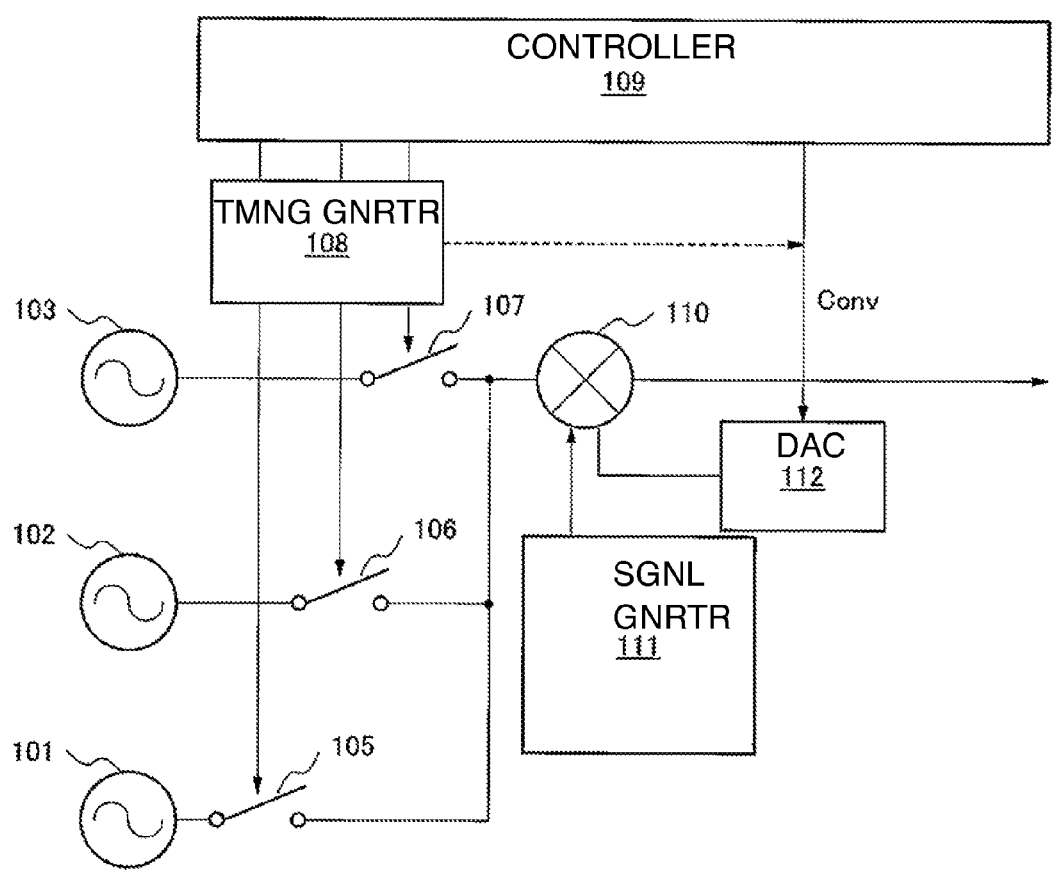
FIG. 5 is a block diagram showing other examples of the transmission signal processing circuit shown in FIG. 4.
Figure 6:
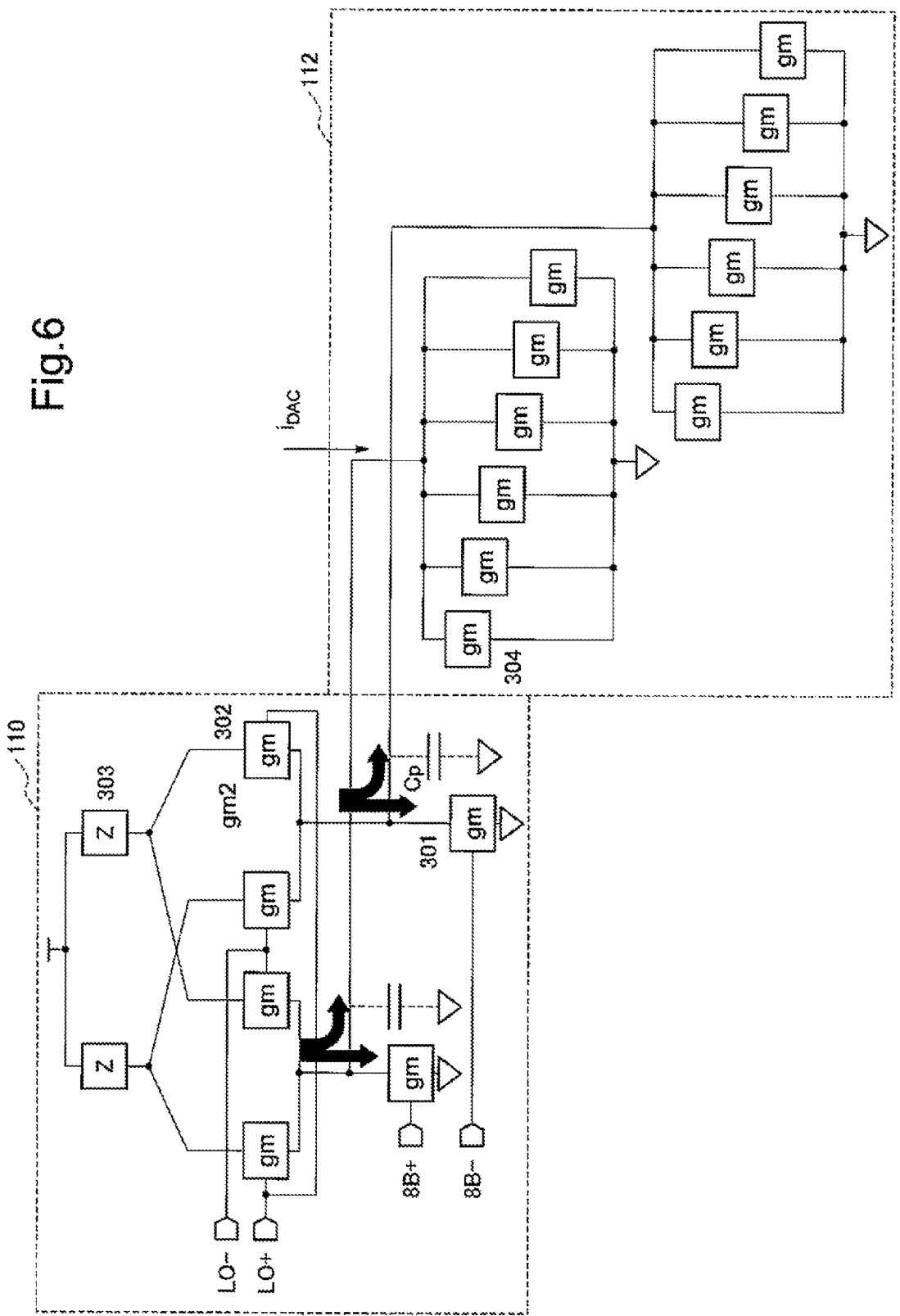
FIG. 6 is a detailed circuit of the transmission mixer 110 and the D/A converter 112 shown in FIG. 4.
Figure 7:
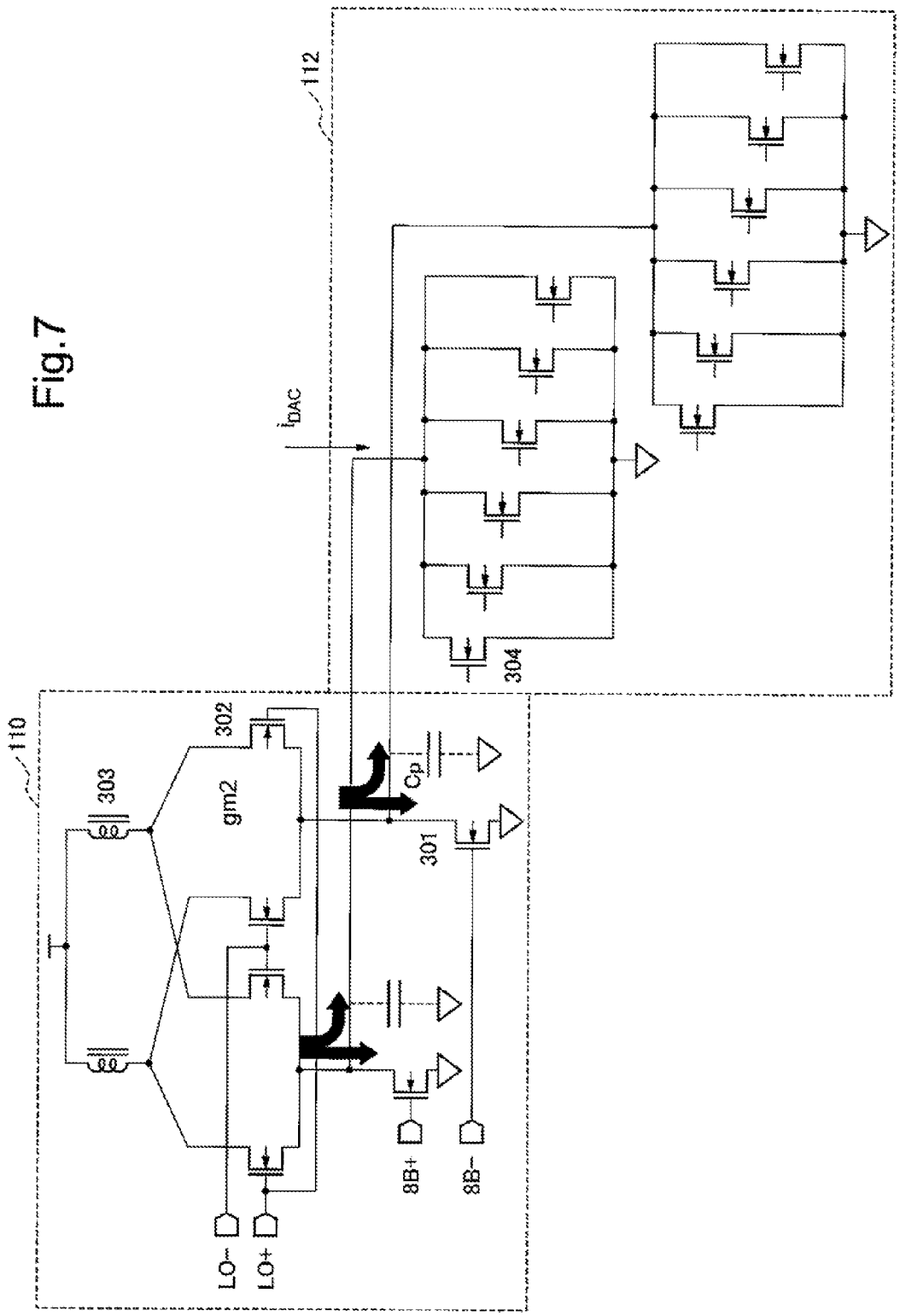
FIG. 7 is an example which replaces other gm devices of the transmission mixer 110 and the D/A converter 112 shown in FIG. 6 with MOSFET.
Figure 8B:
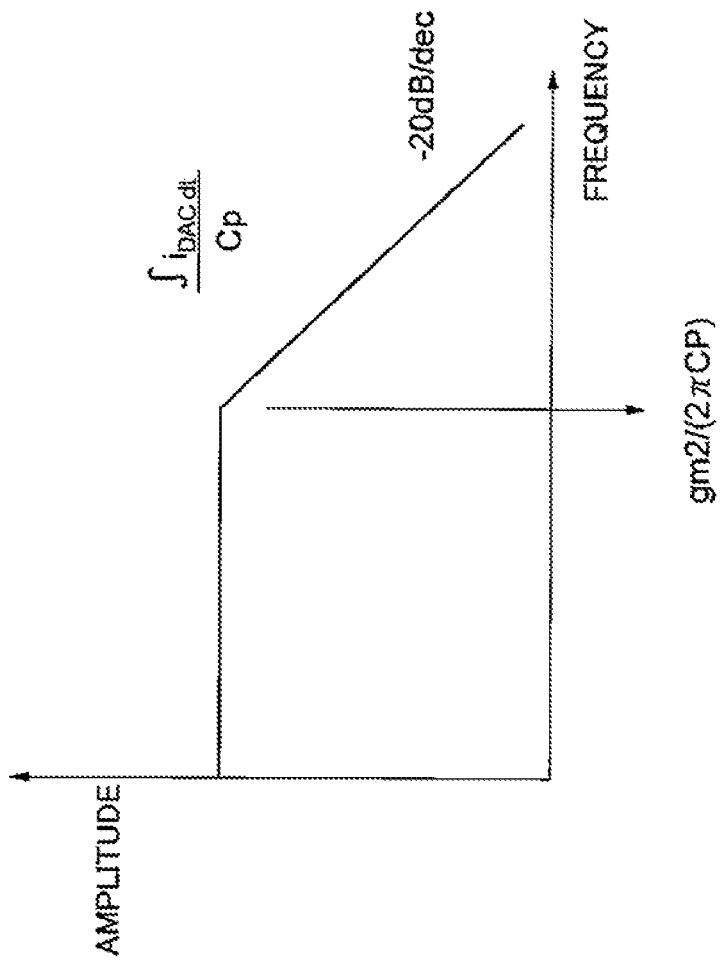
FIG. 8A is the integrating circuit consists of the parasitic capacity Cp and the correction DAC current output, and 8B is a figure showing the frequency—amplitude characteristics of the integrating circuit shown in 8A.
Figure 8A:
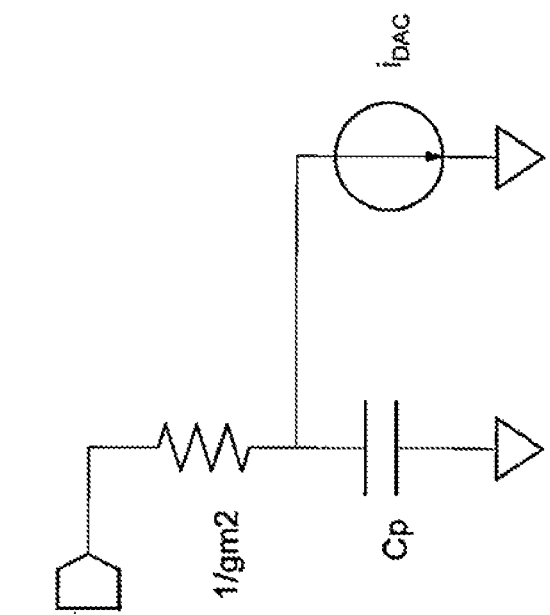
Figure 10A:
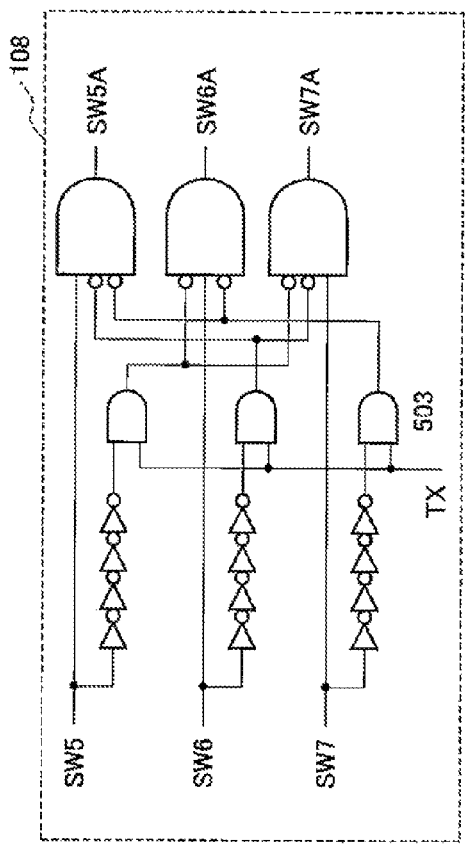
FIG. 10A is a circuit diagram in detail of the timing generator 108, and 10B is a timing chart of the input signals of 10A, and 10C is a timing chart of the output signals of 10A.
Figure 10B:
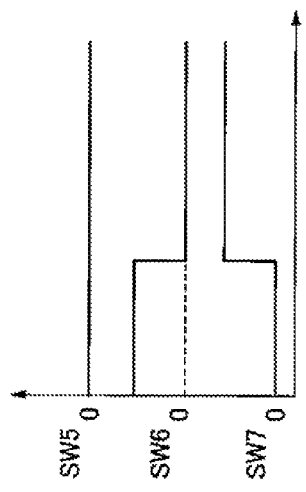
Figure 10C:
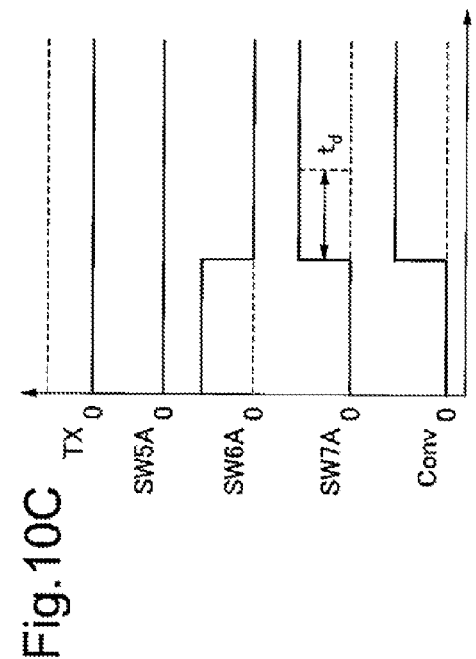
Figure 11:
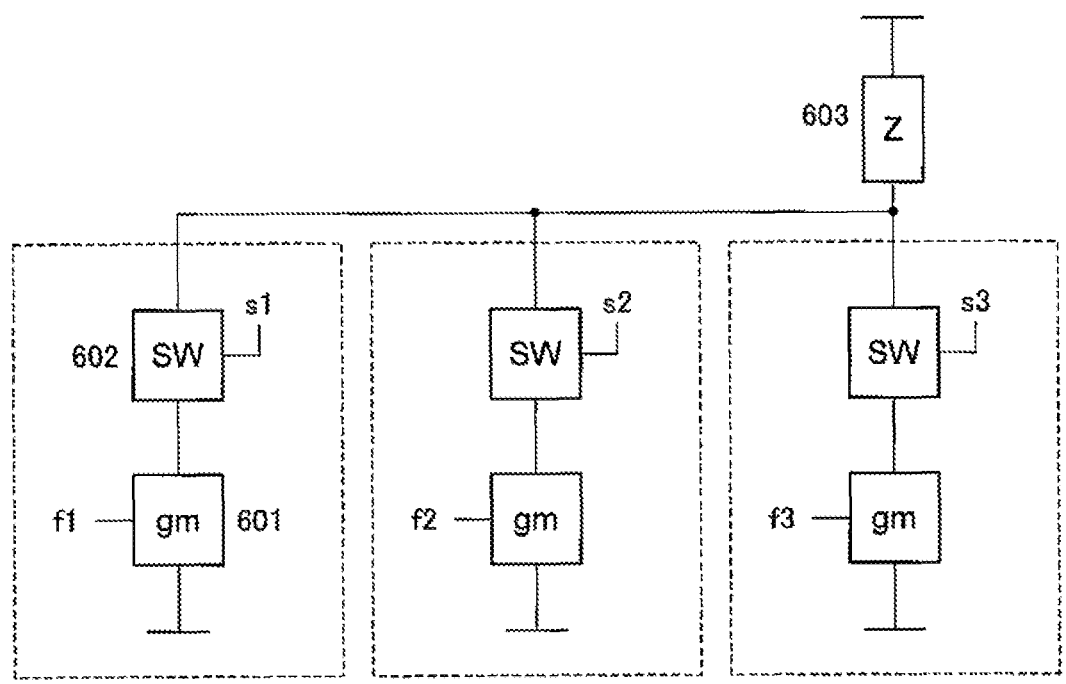
FIG. 11 is the first example of the switches 105-107 shown in FIG. 4.
Figure 12:
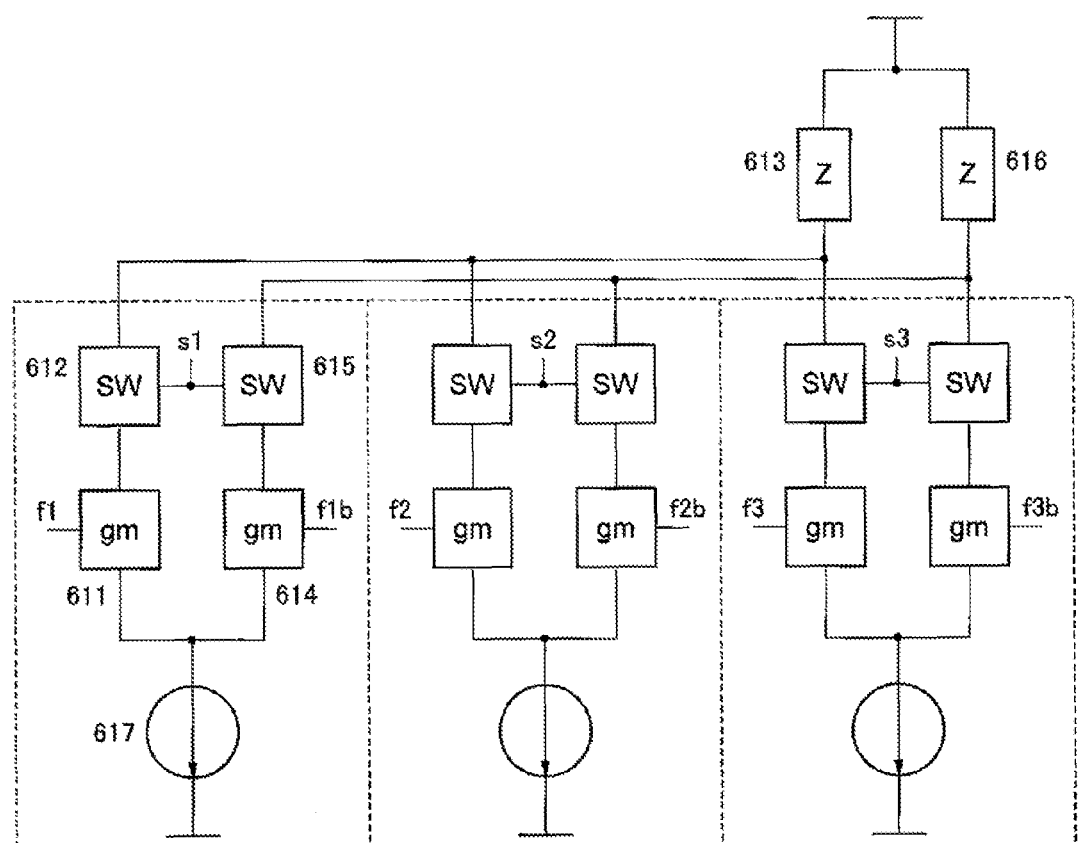
FIG. 12 is the second example of the switches 105-107 shown in FIG. 4.
Figure 13:
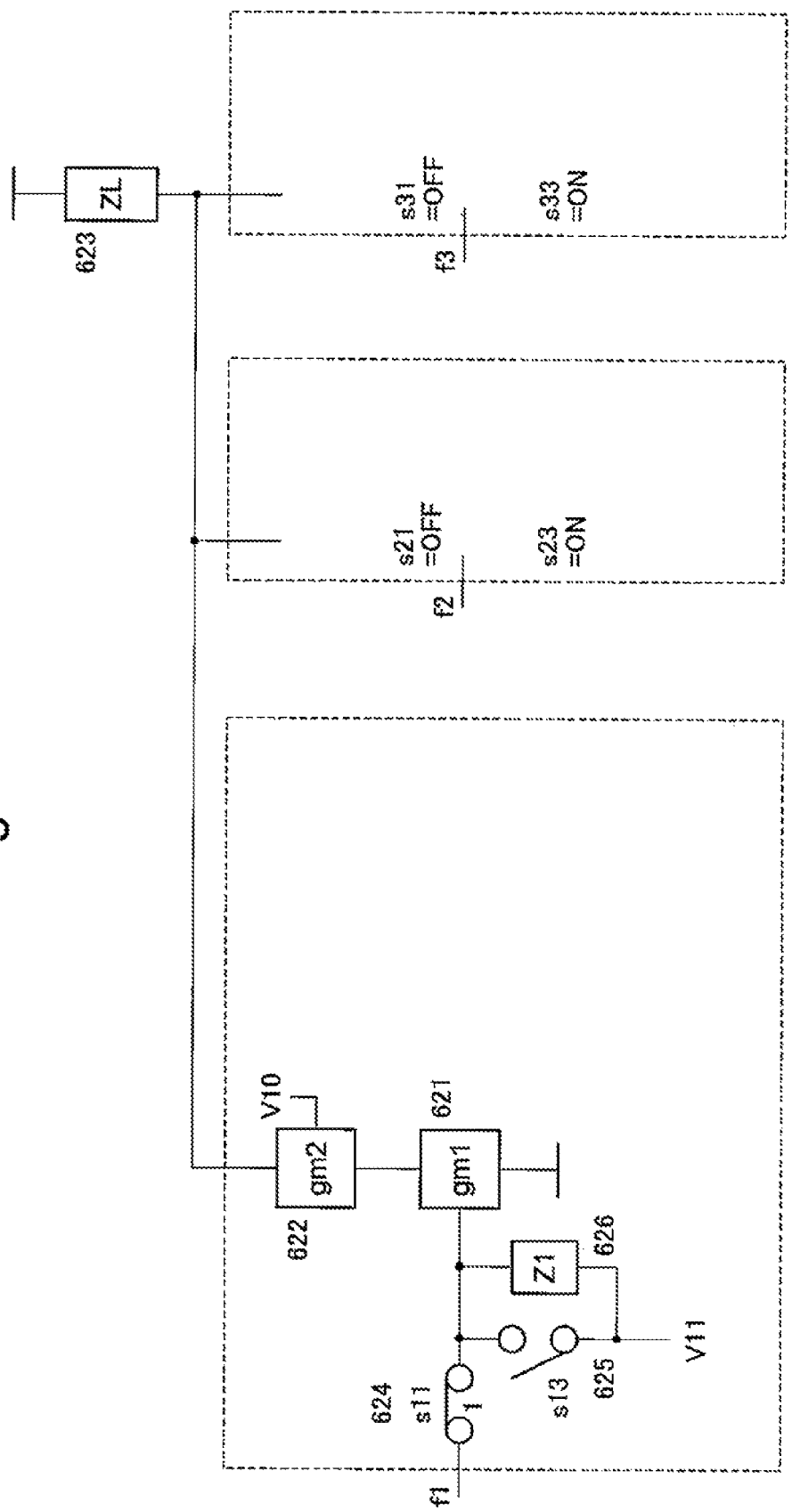
FIG. 13 is the third example of the switches 105-107 shown in FIG. 4.
Figure 14:
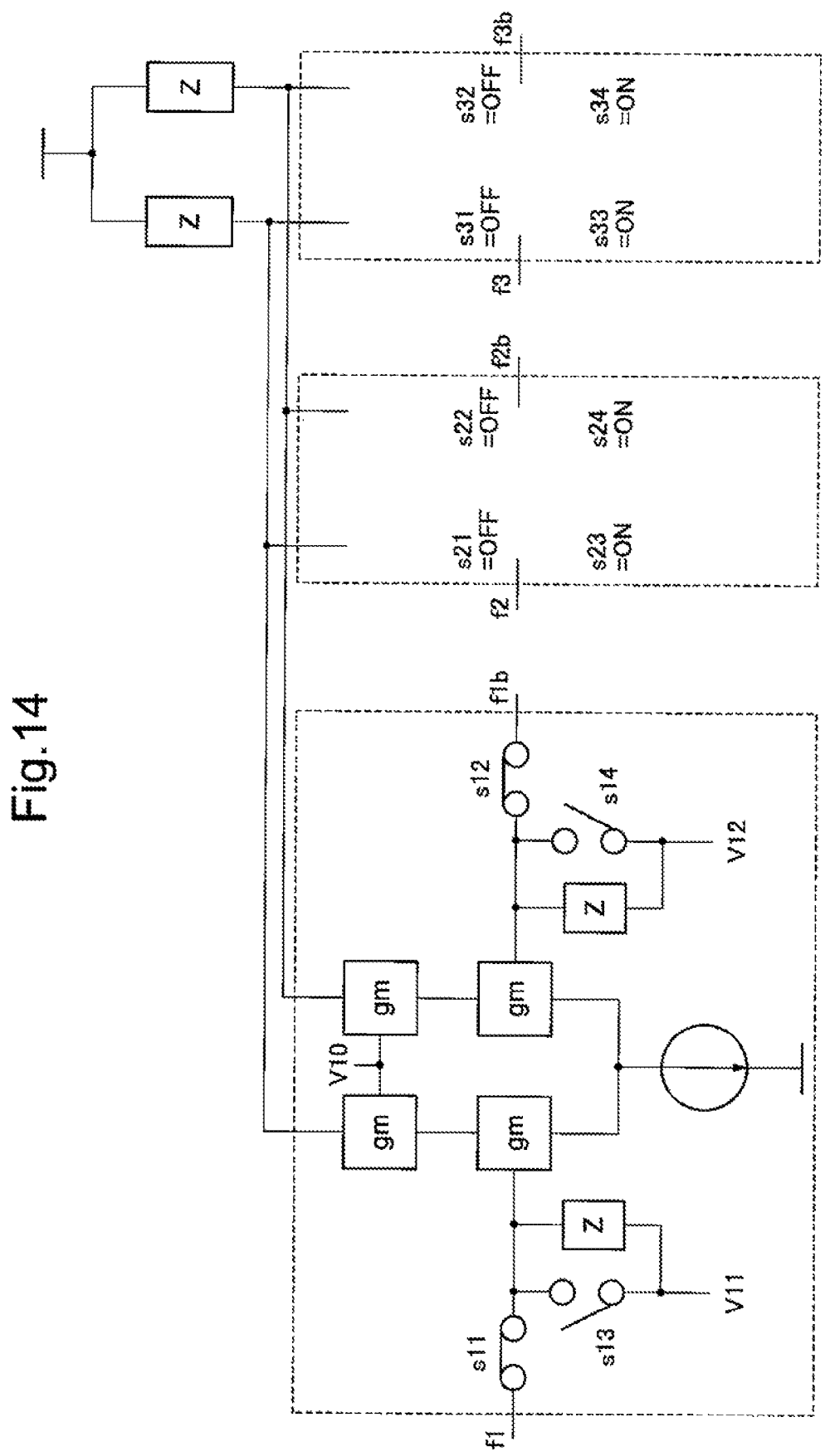
FIG. 14 is the fourth example of the switches 105-107 shown in FIG. 4.
Figure 15:
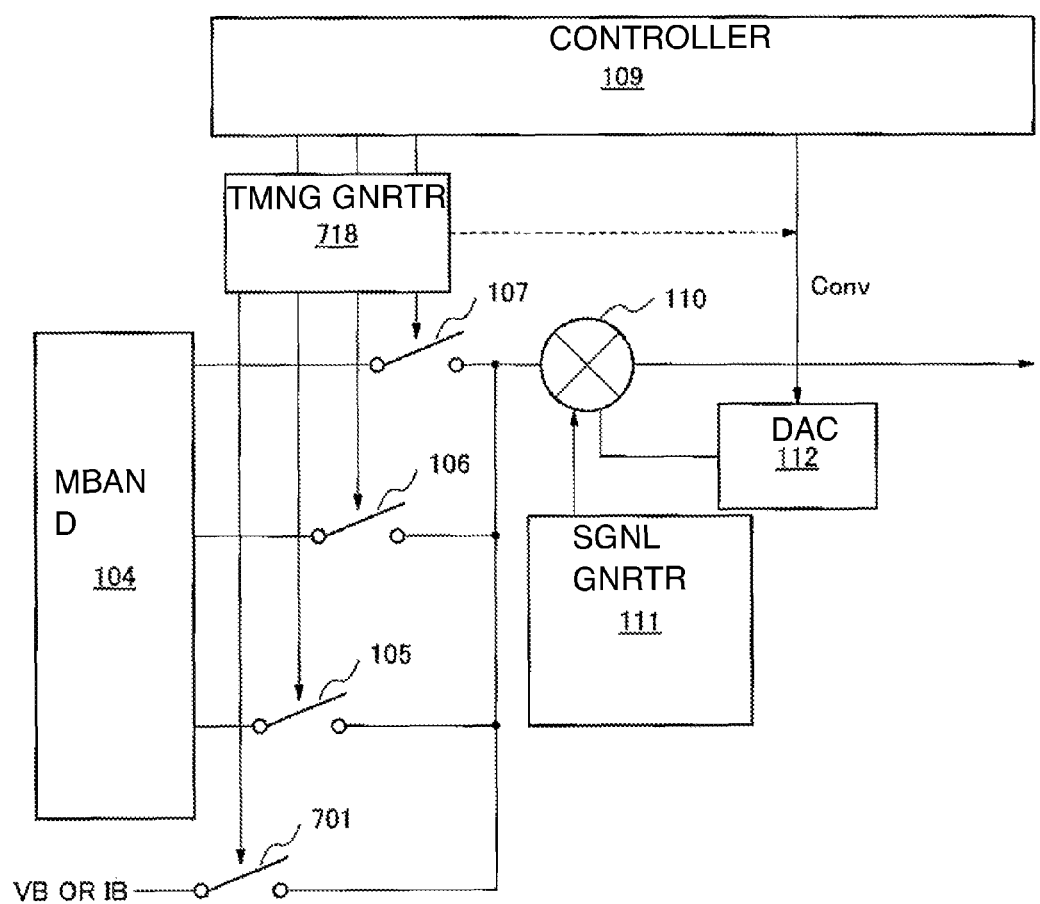
FIG. 15 is a block diagram showing a configuration of the other example of the signal processing circuit according to the present invention.
Figures 16A, 16B:
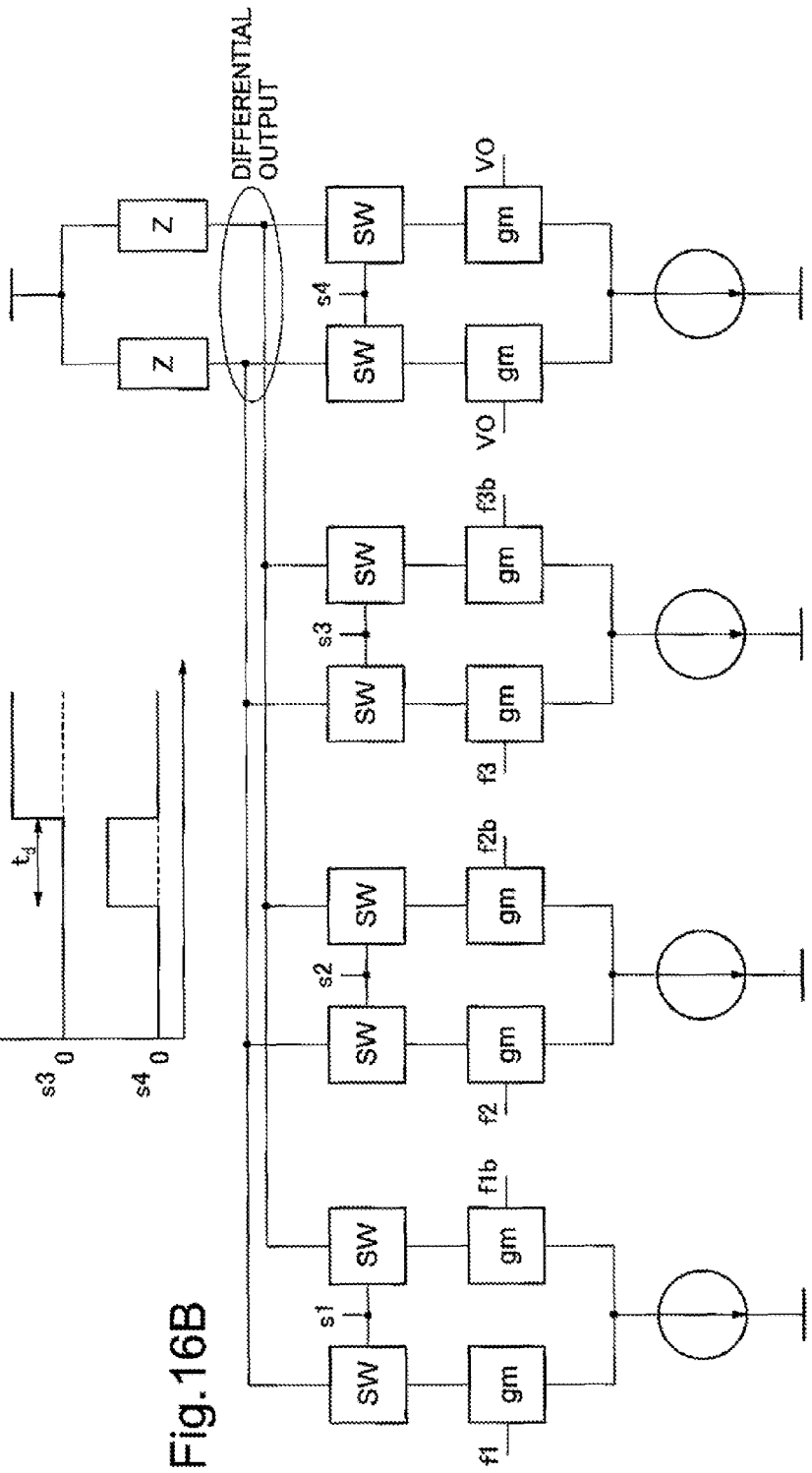
FIG. 16 is an example which indicates the concrete circuit of switches 105-107 and 701 used in the example shown in FIG. 15.
Figure 18A:
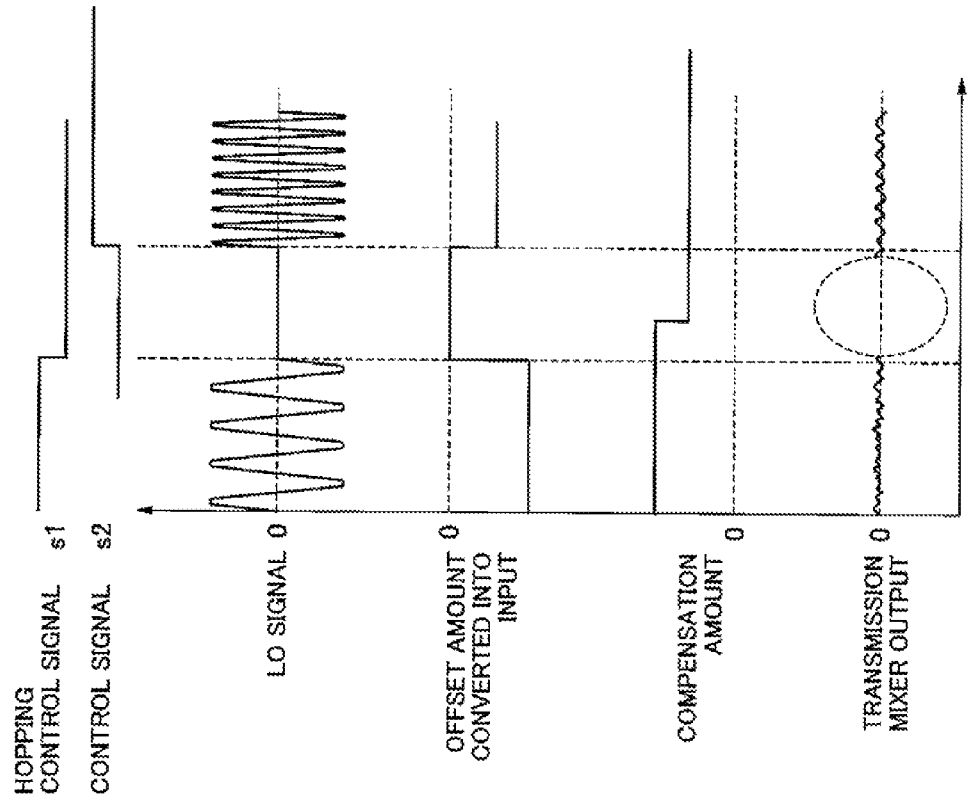
FIG. 18A indicates the operation waveforms around the transmission mixer which is used for the transmission signal processing circuit shown in FIGS. 4, and 18B is a figure representing the operation waveforms around the transmission mixer used for the transmission signal processing circuit in relation to the present invention.
Figure 18B:
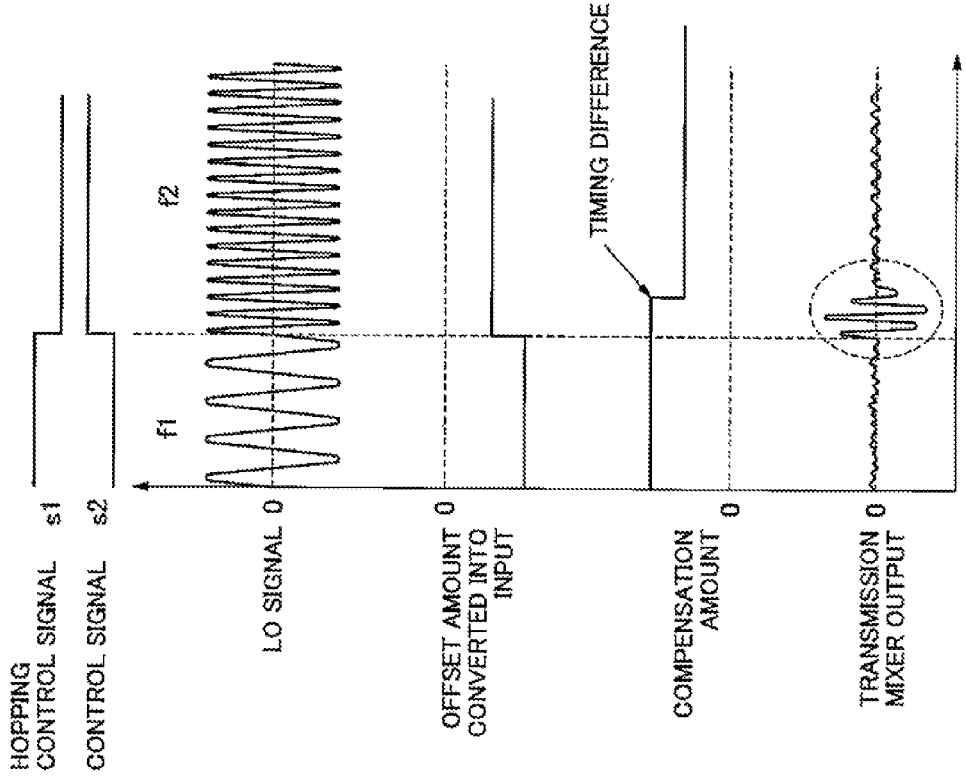
Figure 22:
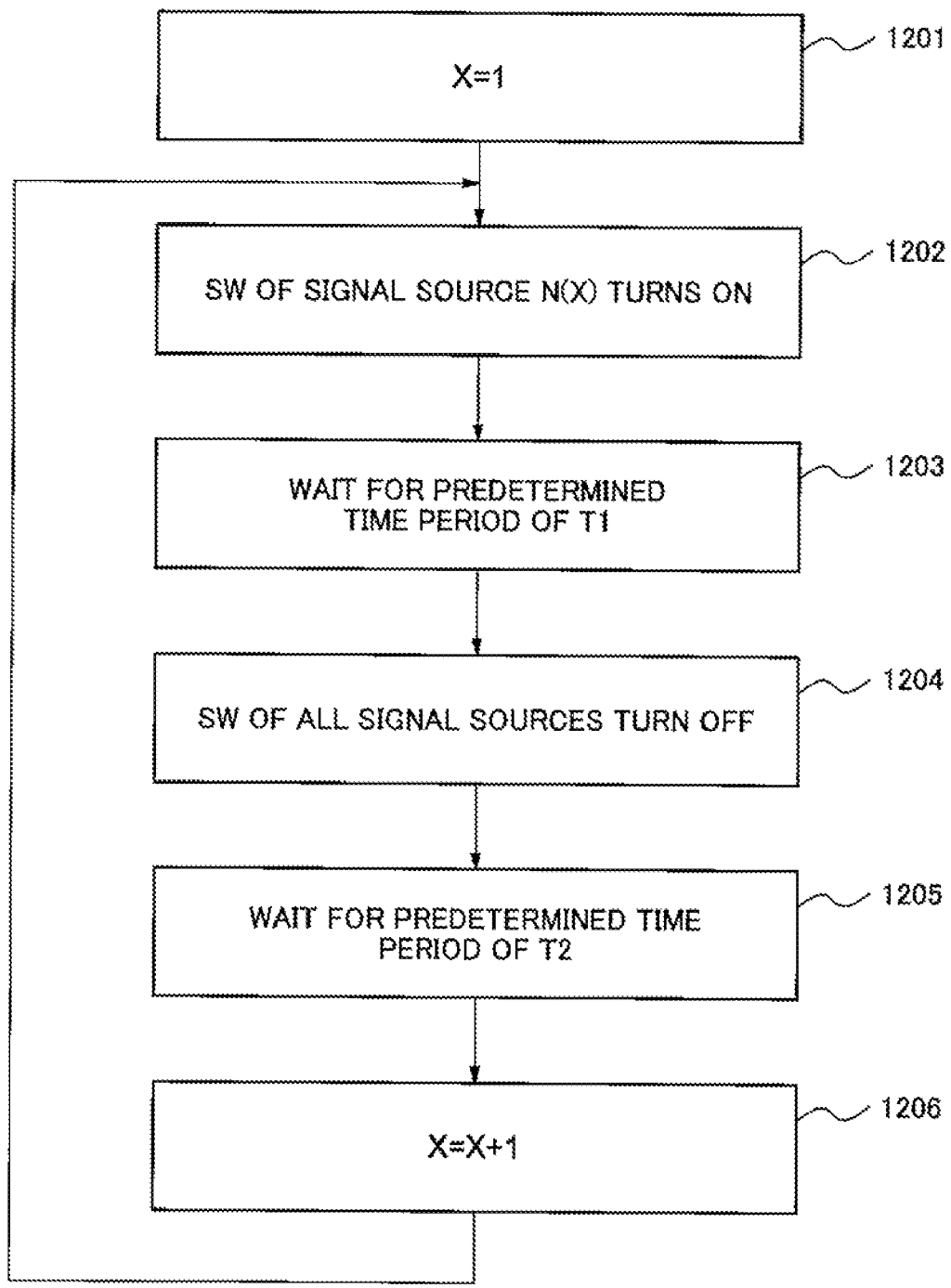
FIG. 22 is a flowchart illustrating a selection operation of LO frequency and a suspended operation of all LO frequencies.
Figure 23A:
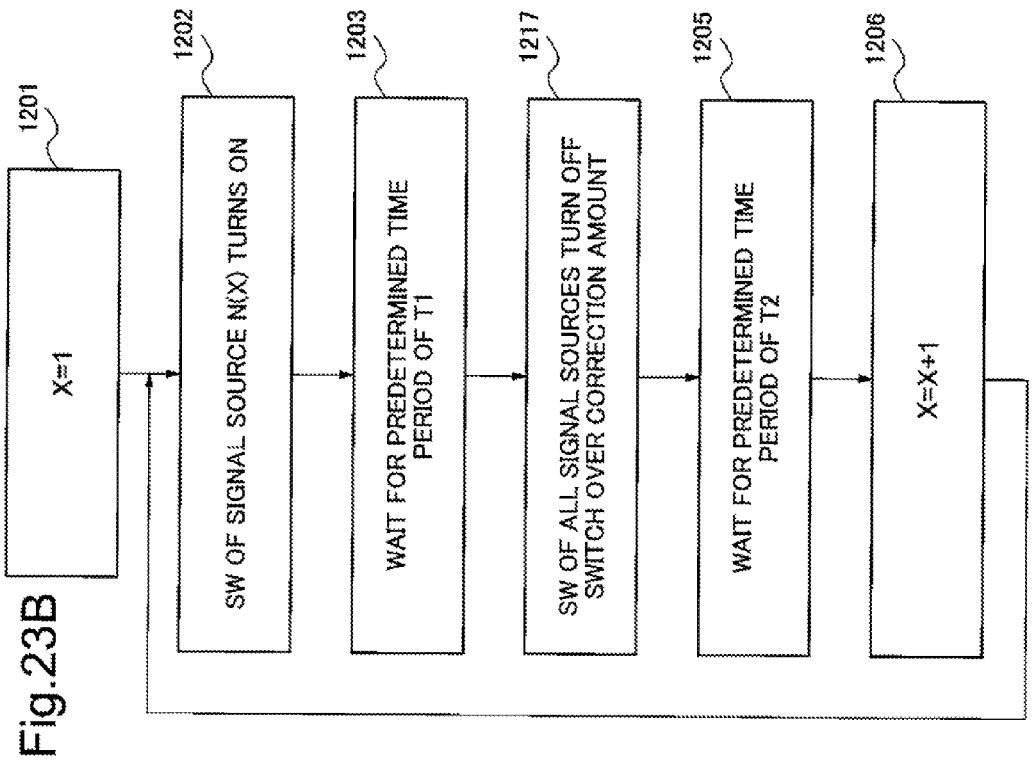
FIG. 23A is a flowchart in which Step 1207 of switch over processing of a correction amount is added to the flowchart shown in FIGS. 22, and 23B is a flowchart in which Step 1204 of the flowchart shown in FIG. 22 is replaced by the step of turning off all SWs of signal line and switching over a correction amount.
Figure 23B:
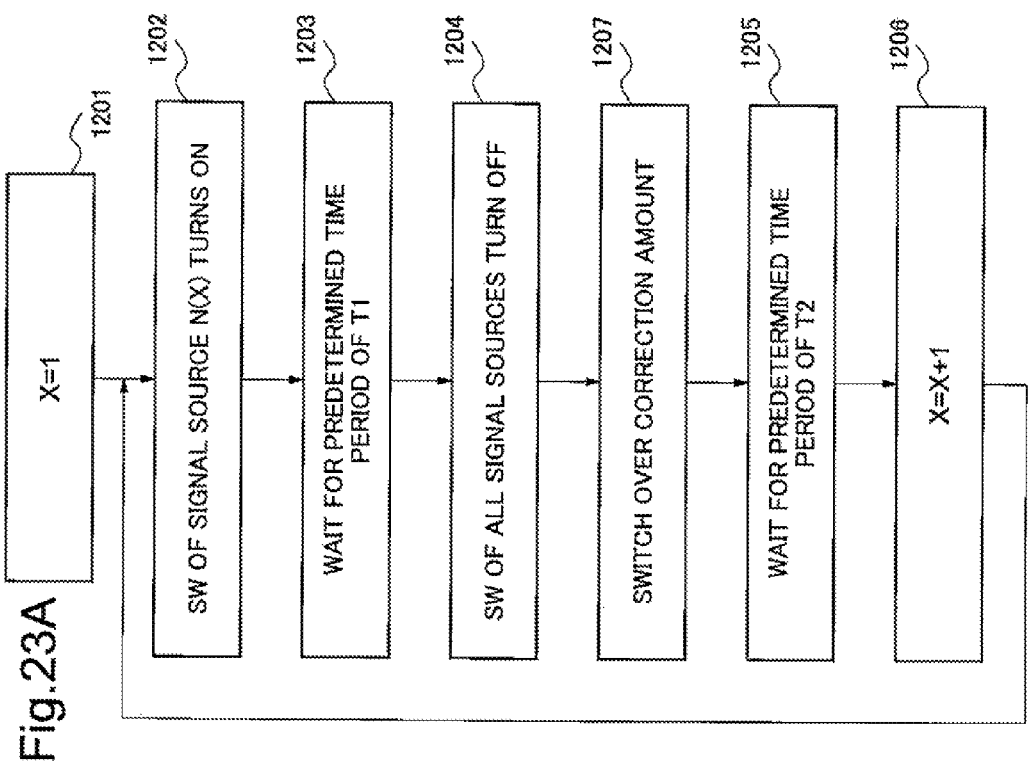
Figure 24:
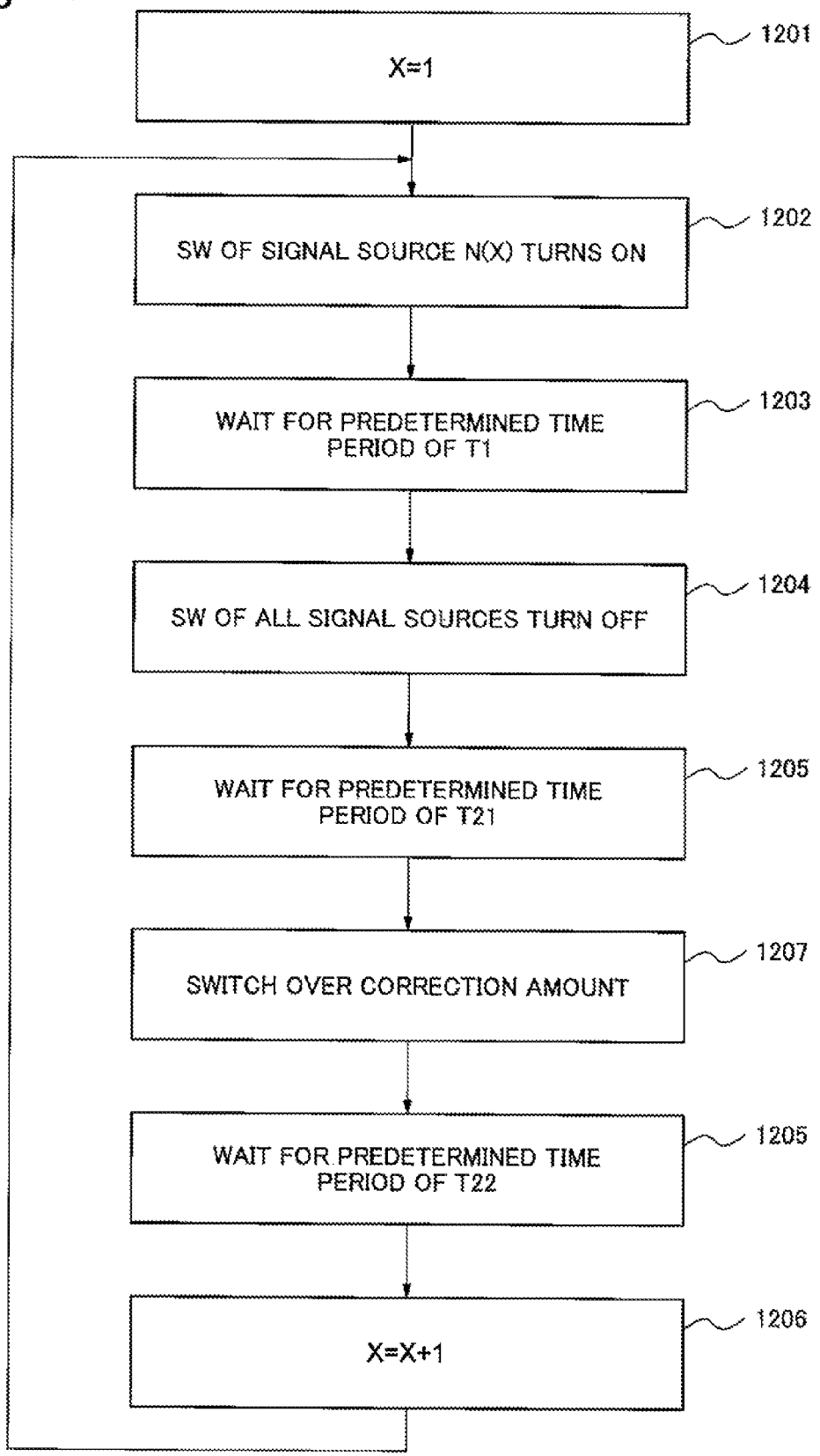
FIG. 24 is a flowchart in which Step 1215 of processing to apply WAIT for only a predetermined time period of T21 is inserted in front of Step 1207 of processing to switch over a correction amount of the flowchart shown in FIG. 23, and processing of Step 1225 to apply WAIT for only a predetermined time period of T22 is inserted after Step 1207.

101-103 oscillator
104 multiband generator.
105-107 And 701 switching element
108 and 718 timing generator
109 controller.
110 transmission mixer (frequency conversion part 1).
111 signal generator.
112 first D/A converter.
301, 302, 611, 614, 622 and 621 transconductance element (gm device)
303, 603, 613 and 616 load impedance
502 or 503 AND gate AND.
602, 612, 615, 624 and 625 switching element
801 power amplifier part 1.
802 amplitude detecting part.
805 switching part.
806 antenna.
810 receiving mixer.
811 signal processor.
812 frequency conversion part 2.
813 power amplifier part 2.
814 offset detecting part.
815 offset adjusting part 2.

The invention claimed is:

1. A transmission signal processing circuit which performs frequency conversion of converting a signal of a plurality of local frequencies generated by a multiband generator and a baseband signal generated by a signal generator into a transmission signal by a transmission mixer, comprising:
   a timing generation means for generating timing to select a signal of a predetermined local frequency in a set time period and not to select any signal of all local frequencies in a different set time period; and
   a plurality of switches which switch over a signal of the local frequency from said each multiband generator to said transmission mixer by an instruction from said timing generation means.

2. The transmission signal processing circuit according to claim 1, further comprising:
   a transconductance element which converts a baseband voltage signal into a current signal; and
   a first D/A converter which changes a differential bias current of said transmission mixes and connects the current output to a current output of said transconductance element.

3. The transmission signal processing circuit according to claim 1, characterized in that
   said plurality of switches include a plurality of blocks, each of which includes a first transconductance element and a first switching element, and a load impedance connected with said plurality of blocks;
   an output of said multiband generator is connected with a control terminal of the first transconductance element; and
   a series connection is provided so that an output current of the first transconductance element may flow to said load impedance component via the first switching element.

4. The transmission signal processing circuit according to claim 1, characterized in that
   said plurality of switches comprise:
   a plurality of blocks, each of which includes first and second transconductance elements, first and second switches and a first impedance component; and
   a load impedance which is connected with said plurality of blocks, and
   wherein an output of said multiband generator is connected with one end of said first switch, the other end of said first switch is connected with a control terminal of said first transconductance element and one end of said second switch and one end of said first impedance component, each of the other ends of said second switch and said first impedance component is connected with a bias voltage, and a series connection is provided so that an output current of the first transconductance element may flow to said load impedance component via an output of the second transconductance element.

5. A receiving signal processing circuit which performs frequency conversion of converting a receiving signal and a signal of a plurality of local frequencies generated by a multiband generator into a baseband signal by a receiving mixer, comprising:
   a timing generation means for suspending generation of timing in which selection of all local frequencies is stopped; and
   a plurality of switches which switch over a signal of the local frequency from said each multiband generator to said receiving mixer by an instruction from said timing generation means.

6. The receiving signal processing circuit according to claim 5, further comprising:
   an amplifier circuit which amplifies an output of said receiving mixer; and
   a second D/A converter which changes an offset voltage of said amplifier circuit.

7. The receiving signal processing circuit according to claim 5, characterized in that
   said plurality of switches include a plurality of blocks, each of which includes a first transconductance element and a first switching element, and a load impedance connected with said plurality of blocks;
   an output of said multiband generator is connected with a control terminal of the first transconductance element; and
   a series connection is provided so that an output current of the first transconductance element may flow to said load impedance component via the first switching element.

8. The receiving signal processing circuit according to claim 5, characterized in that
   said plurality of switches comprise:
   a plurality of blocks, each of which includes first and second transconductance elements, first and second switches and a first impedance component; and a load impedance which is connected with said plurality of blocks, and wherein an output of said multiband generator is connected with one end of said first switch, the other end of said first switch is connected with a control terminal of said first transconductance element and one end of said second switch and one end of said first impedance component, each of the other ends of said second switch and said first impedance component is connected with a bias voltage, and a series connection is provided so that an output current of the first transconductance element may flow to said load impedance component via an output of the second transconductance element.

9. A transmission and receiving signal processing circuit which performs frequency conversion of converting a signal of a plurality of local frequencies generated by a multiband generator and a baseband signal generated by a signal generator into a transmission signal by a transmission mixer, and of converting a receiving signal and a signal of a plurality of local frequencies generated by the multiband generator into a baseband signal by a receiving mixer, comprising:

a timing generation means for generating timing to select a signal of a predetermined local frequency in a set time period and not to select any signal of all local frequencies in a different set time period in transmitting, and suspending generation of timing in which selection of all local frequencies is stopped in receiving; and a plurality of switches which switch over a signal of the local frequency from said each multiband generator to said transmission mixer by an instruction from said timing generation means in transmitting, and switches over a signal of the local frequency from said each multiband generator to said receiving mixer by an instruction from said timing generation means in receiving.

10. The transmission and receiving signal processing circuit according to claim 9, further comprising:

a transconductance element which converts a baseband voltage signal into a current signal;

a first D/A converter which changes a differential bias current of said transmission mixer and connects the current output to a current output of said transconductance element;

an amplifier circuit which amplifies an output of said receiving mixer; and a second D/A converter which changes an offset voltage of said amplifier circuit.

11. The transmission and receiving signal processing circuit according to claim 9, characterized in that said plurality of switches include a plurality of blocks, each of which includes a first transconductance element and a first switching element, and a load impedance connected with said plurality of blocks;

an output of said multiband generator is connected with a control terminal of the first transconductance element; and a series connection is provided so that an output current of the first transconductance element may flow to said load impedance component via the first switching element.

12. The transmission and receiving signal processing circuit according to claim 9, characterized in that said plurality of switches comprise:

a plurality of blocks, each of which includes first and second transconductance elements, first and second switches and a first impedance component; and a load impedance which is connected with said plurality of blocks, and wherein an output of said multiband generator is connected with one end of said first switch, the other end of said first switch is connected with a control terminal of said first transconductance element and one end of said second switch and one end of said first impedance component, each of the other ends of said second switch and said first impedance component is connected with a bias voltage, and a series connection is provided so that an output current of the first transconductance element may flow to said load impedance component via an output of the second transconductance element.

13. A signal processing method of a signal processing circuit which comprises a plurality of switches for controlling a mixer, a plurality of local signals and passage of the local signal to a local port of the mixer, and a D/A converter for changing a differential bias current which flows into the mixer, comprising the processes of:

a first processing to turn on a predetermined switch in a plurality of switches;

a second processing to wait the switch operation for a predetermined time period of T1;

a third processing to turn off all of a plurality of switches;

a fourth processing to switch a setting value of the D/A converter; and a fifth processing to wait the switch operation for a predetermined time period of T2.

14. A signal processing method of a signal processing circuit which comprises a plurality of switches for controlling a mixer, a plurality of local signals and passage of the local signal to a local port of the mixer, and a D/A converter for changing a differential bias current which flows into the mixer, comprising the processes of:

a first processing to turn on a predetermined switch in a plurality of switches;

a second processing to wait the switch operation for a predetermined time period of T1;

a third processing to turn off all of a plurality of switches;

a fourth processing to wait the switch operation for a predetermined time period of T21;

a fifth processing to switch over a setting value of the D/A converter; and a sixth processing to wait the switch operation for a predetermined time period of T22.

15. A non-transitory recording medium which records a program for causing a computer to execute a processing to control a mixer, a plurality of local signals and passage of the local signal to a local port of the mixer, and a processing to change a differential bias current which flows into the mixer, characterized by causing a computer to execute the processes of:

a first processing to turn on a predetermined switch in a plurality of switches;

a second processing to wait the switch operation for a predetermined time period of T1;

a third processing to turn off all of a plurality of switches;

a fourth processing to switch over a setting value of the D/A converter; and a fifth processing to wait the switch operation for a predetermined time period of T2.

16. A non-transitory recording medium which records a program for causing a computer to execute a processing to control a mixer, a plurality of local signals and passage of the local signal to a local port of the mixer, and a processing to change a differential bias current which flows into the mixer, characterized by causing a computer to execute the processes of:

a first processing to turn on a predetermined switch in a plurality of switches;

a second processing to wait the switch operation for a predetermined time period of T1;

a third processing to turn off all of a plurality of switches;

a fourth processing to wait the switch operation for a predetermined time period of T21;

a fifth processing to switch over a setting value of the D/A converter; and a sixth processing to wait the switch operation for a predetermined time period of T22.

17. A transmission signal processing circuit which performs frequency conversion of converting a signal of a plurality of local frequencies generated by a multiband generator and a baseband signal generated by a signal generator into a transmission signal by a transmission mixer, comprising:

a timing generation part which generates timing to select a signal of a predetermined local frequency in a set time period and not to select any signal of all local frequencies in a different set time period; and a plurality of switches which switch over a signal of the local frequency from said each multiband generator to said transmission mixer by an instruction from said timing generation part.

18. A receiving signal processing circuit which performs frequency conversion of converting a receiving signal and a signal of a plurality of local frequencies generated by a multiband generator into a baseband signal by a receiving mixer, comprising:

a timing generation part which suspends generation of timing in which selection of all local frequencies is stopped; and a plurality of switches which switch over a signal of the local frequency from said each multiband generator to said receiving mixer by an instruction from said timing generation part.

19. A transmission and receiving signal processing circuit which performs frequency conversion of converting a signal of a plurality of local frequencies generated by a multiband generator and a baseband signal generated by a signal generator into a transmission signal by a transmission mixer, and of converting a receiving signal and a signal of a plurality of local frequencies generated by the multiband generator into a baseband signal by a receiving mixer, comprising:

a timing generation part which generates timing to select a signal of a predetermined local frequency in a set time period and not to select any signal of all local frequencies in a different set time period in transmitting, and suspending generation of timing in which selection of all local frequencies is stopped in receiving; and a plurality of switches which switch over a signal of the local frequency from said each multiband generator to said transmission mixer by an instruction from said timing generation part in transmitting, and switches over a signal of the local frequency from said each multiband generator to said receiving mixer by an instruction from said timing generation part in receiving.

* * * * *